United States Patent
Yoo et al.

(10) Patent No.: US 12,287,674 B2
(45) Date of Patent: Apr. 29, 2025

(54) ELECTRONIC DEVICE FOR MOVING AND DISPLAYING AT LEAST ONE OBJECT ACCORDING TO EXPANSION OF FLEXIBLE DISPLAY, AND METHOD FOR CONTROLLING SAME

(71) Applicant: Samsung Electronics Co., Ltd., Suwon-si (KR)

(72) Inventors: Jinseon Yoo, Suwon-si (KR); Jiwon Park, Suwon-si (KR); Soonkyu Jang, Suwon-si (KR); Doeun Shin, Suwon-si (KR); Joayoung Lee, Suwon-si (KR); Yunjeong Ji, Suwon-si (KR); Kawon Cheon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/329,232

(22) Filed: Jun. 5, 2023

(65) Prior Publication Data
US 2023/0315156 A1 Oct. 5, 2023

Related U.S. Application Data

(63) Continuation of application No. PCT/KR2021/018028, filed on Dec. 1, 2021.

(30) Foreign Application Priority Data
Dec. 3, 2020 (KR) .................... 10-2020-0167441

(51) Int. Cl.
G06F 1/16 (2006.01)
G09F 9/30 (2006.01)
H04M 1/02 (2006.01)

(52) U.S. Cl.
CPC .......... *G06F 1/1652* (2013.01); *G06F 1/1624* (2013.01); *G06F 1/1677* (2013.01);
(Continued)

(58) Field of Classification Search
None
See application file for complete search history.

(56) References Cited

U.S. PATENT DOCUMENTS

2008/0207273 A1 8/2008 Huo
2012/0280924 A1* 11/2012 Kummer ............... G06F 1/1641
345/173

(Continued)

FOREIGN PATENT DOCUMENTS

CN 114077281 A 2/2022
KR 20060017042 A 2/2006
(Continued)

OTHER PUBLICATIONS

International Search Report for PCT/KR2021/018028 mailed Mar. 10, 2022, 3 pages.
(Continued)

*Primary Examiner* — Ifedayo B Iluyomade
(74) *Attorney, Agent, or Firm* — NIXON & VANDERHYE P.C.

(57) ABSTRACT

An electronic device for moving and displaying at least one object according to the expansion of a flexible display, and a method for controlling same. An electronic device may include a flexible display, and at least one processor operably connected to the flexible display, wherein the at least one processor is configured to: display multiple objects of a first application on the flexible display; detect an expansion event for expanding the flexible display while the multiple objects are being displayed on the flexible display; and while maintaining a position in which at least one object among (Continued)

the multiple objects is displayed, move one or more objects among the remaining objects to an area expanded according to the expansion event and display the one or more objects thereon.

10 Claims, 38 Drawing Sheets

(52) U.S. Cl.
CPC .......... *G09F 9/301* (2013.01); *H04M 1/0245* (2013.01); *H04M 1/0268* (2013.01)

(56) References Cited

U.S. PATENT DOCUMENTS

| | | |
|---|---|---|
| 2013/0082924 A1 | 4/2013 | Kumar et al. |
| 2013/0128439 A1 | 5/2013 | Walters et al. |
| 2014/0218375 A1 | 8/2014 | Kim |
| 2017/0061932 A1 | 3/2017 | Kwon et al. |
| 2017/0147189 A1* | 5/2017 | Ryu .................... G06F 3/04886 |
| 2017/0212607 A1 | 7/2017 | Yoon |
| 2017/0286042 A1 | 10/2017 | Lee et al. |
| 2019/0019476 A1 | 1/2019 | Ge et al. |
| 2023/0075430 A1* | 3/2023 | Kim ...................... G06F 1/1677 |

FOREIGN PATENT DOCUMENTS

| | | |
|---|---|---|
| KR | 100818170 B1 | 4/2008 |
| KR | 20080079191 A | 8/2008 |
| KR | 20100027502 A | 3/2010 |
| KR | 20140100149 A | 8/2014 |
| KR | 101522882 B1 | 5/2015 |
| KR | 20160011140 A | 1/2016 |
| KR | 20160018830 A | 2/2016 |
| KR | 20160142172 A | 12/2016 |
| KR | 20170024942 A | 3/2017 |
| KR | 20170060519 A | 6/2017 |
| KR | 20170089664 A | 8/2017 |
| KR | 20180094016 A | 8/2018 |
| KR | 20200071699 | * 6/2020 ............... G06F 1/16 |

OTHER PUBLICATIONS

Written Opinion of the ISA for PCT/KR2021/018028 mailed Mar. 10, 2022, 4 pages.

* cited by examiner

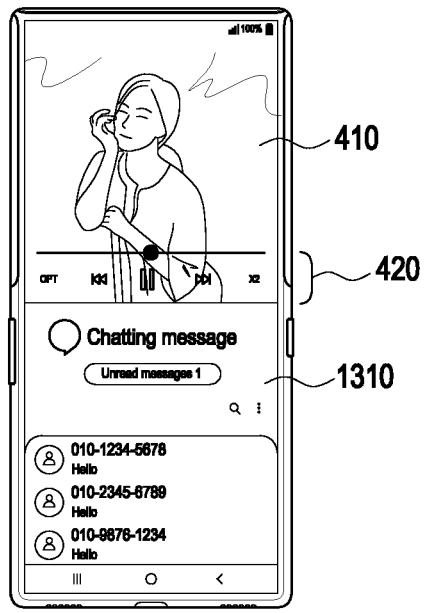
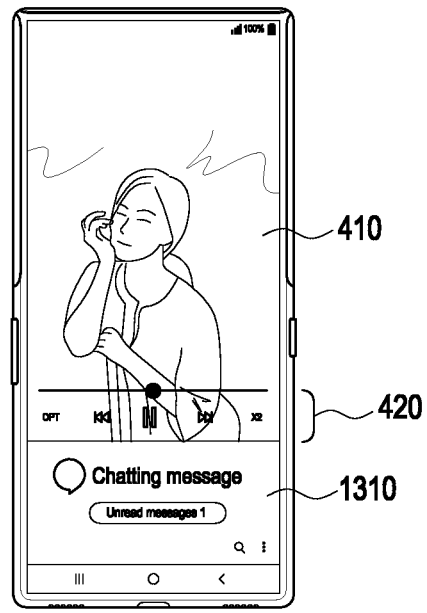
FIG. 13A  FIG. 13B
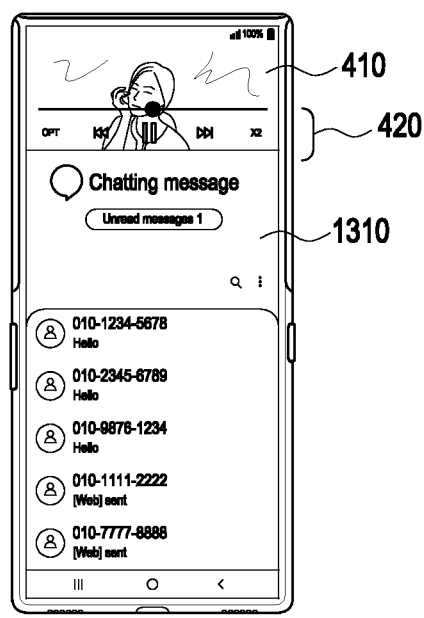
FIG. 13C

ELECTRONIC DEVICE FOR MOVING AND DISPLAYING AT LEAST ONE OBJECT ACCORDING TO EXPANSION OF FLEXIBLE DISPLAY, AND METHOD FOR CONTROLLING SAME

CROSS REFERENCE TO RELATED APPLICATIONS

This application is a continuation of International Application No. PCT/KR2021/018028 filed on Dec. 1, 2021, designating the United States, in the Korean Intellectual Property Receiving Office, and claiming priority to Korean Patent Application No. KR 10-2020-0167441, filed Dec. 3, 2020, the disclosures of which are all hereby incorporated by reference herein in their entireties.

BACKGROUND

Field

Certain example embodiments relate to an electronic device that moves and/or displays at least one object according to an extension of a flexible display and/or a method for controlling the same.

Description of Related Art

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

Recently, electronic devices which are extendible in various manners are being provided to users. However, application creators are unable to provide user interfaces optimized for various extendible types of electronic devices.

SUMMARY

According to an example embodiment, there is disclosed an electronic device having various display extension schemes (e.g., an electronic device extendible in a T shape), which provides a user interface optimized for the electronic device by moving at least one object and displaying it in the extended area according to an extension of the flexible display.

According to an example embodiment, there is disclosed an electronic device allowing the user to intuitively recognize which direction the main screen is displayed when the flexible display of the electronic device is extended by providing icons having various shapes to the user through the electronic device.

According to an example embodiment, an electronic device may comprise a flexible display and at least one processor operably connected, directly or indirectly, with the flexible display. The at least one processor may be configured to display a plurality of objects of a first application on the flexible display, detect an extension event for extending the flexible display while displaying the plurality of objects on the flexible display, and maintain a position of display of at least one object among the plurality of objects while moving one or more objects among remaining objects to an area extended according to the extension event and displaying the moved objects.

According to an example embodiment, a method for controlling an electronic device may comprise displaying a plurality of objects of a first application on a flexible display of the electronic device, detecting an extension event for extending the flexible display while displaying the plurality of objects on the flexible display, and maintaining a position of display of at least one object among the plurality of objects while moving one or more objects among remaining objects to an area extended according to the extension event and displaying the moved objects.

According to an example embodiment, an electronic device may comprise a flexible display and at least one processor operably connected, directly or indirectly, with the flexible display. The at least one processor may be configured to provide icons having a plurality of shapes through the flexible display, receive a selection input for a first icon among the icons having the plurality of shapes, and display, through the flexible display, an execution screen of an application corresponding to the first icon to correspond to a shape of the first icon.

According to an example embodiment, in an electronic device having various display extension schemes (e.g., an electronic device extendible in a T shape), it is possible to provide a user interface optimized for the electronic device by moving at least one object and displaying it in the extended area according to an extension of the flexible display.

According to an example embodiment, it is possible to allow the user to intuitively recognize which direction the main screen is displayed when the flexible display of the electronic device is extended by providing icons having various shapes to the user through the electronic device.

The effects set forth herein are not limited thereto, and it is apparent to one of ordinary skill in the art that various effects may be disclosed herein.

BRIEF DESCRIPTION OF DRAWINGS

The foregoing and other features of example embodiments will become more apparent from the following detailed description of embodiments when read in conjunction with the accompanying drawings. In the drawings, like reference numerals refer to like elements.

FIGS. 13A, 13B, 13C, and 13D are views illustrating an example of a function or operation as shown in FIG. 12;

DETAILED DESCRIPTION

Figure 1:
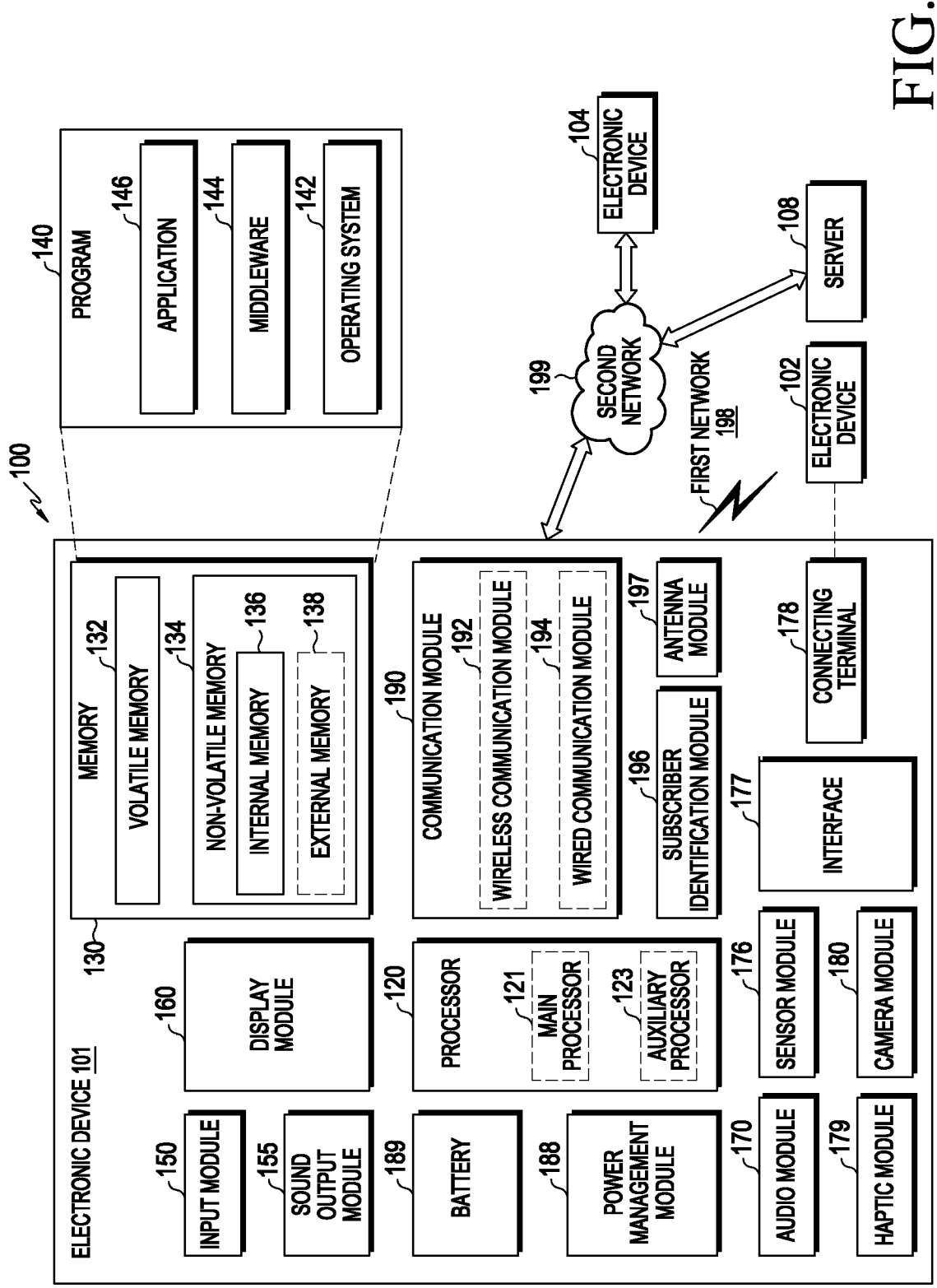
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
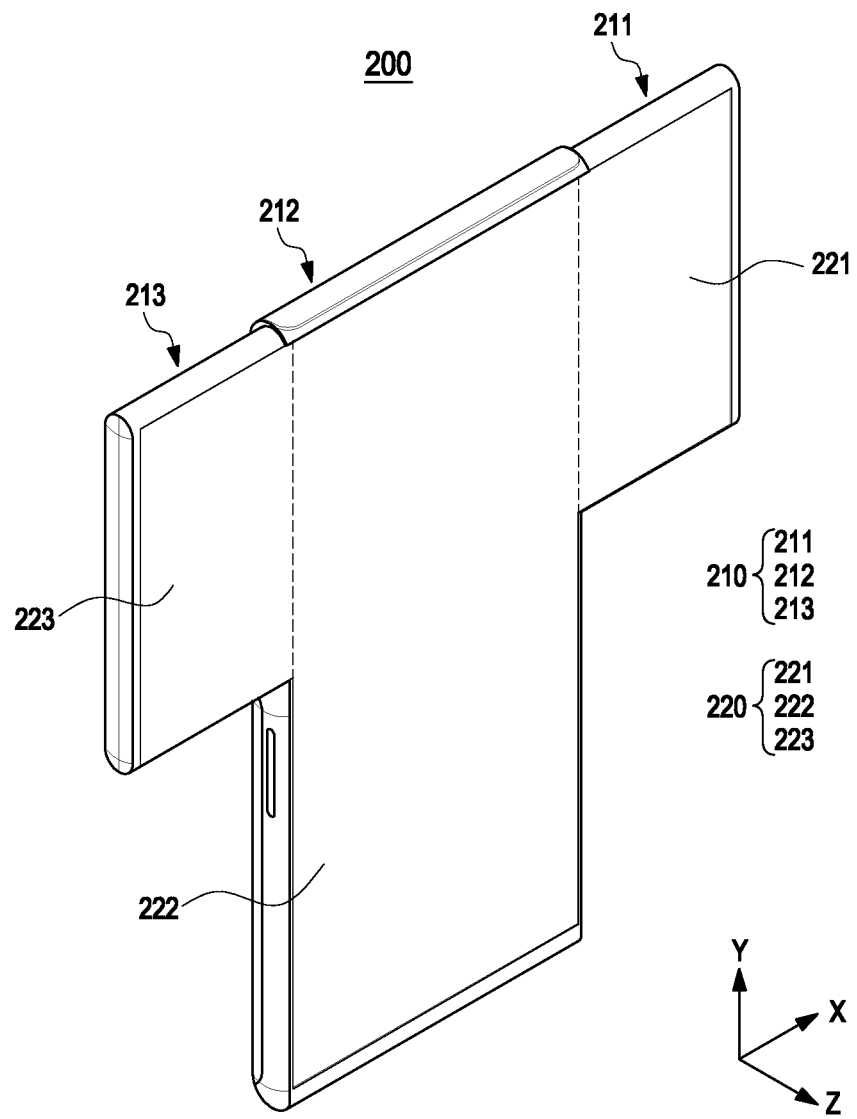
FIG. 2A is a perspective view illustrating an electronic device according to various example embodiments.

FIG. 2A is a perspective view illustrating an electronic device 200 according to various example embodiments.

FIG. 2A and the subsequent figures illustrate a spatial coordinate system defined by an X-axis, a Y-axis and a Z-axis orthogonal to each other. Here, the X axis may indicate a width direction of the electronic device 200, the Y axis may indicate a length direction of the electronic device 200, and the Z axis may indicate a height (or thickness) direction of the electronic device 200. In the following description, "first direction" may indicate a direction parallel to the Z axis. Further, in the following description, "second direction" may indicate a direction parallel to the X axis. Further, in the following description, "third direction" may indicate a direction parallel to the Y axis.

An electronic device 200 (e.g., the electronic device 101 of FIG. 1) according to various example embodiments may be various types of devices. The electronic devices 200 may include, for example, a portable communication device (e.g., a smart phone), a computer device, a portable multimedia device, a portable medical device, a camera, a wearable device, or a home appliance. According to an example embodiment, the electronic devices 200 are not limited to those described above.

Further, according to various example embodiments, the electronic device 200 (e.g., the electronic device 101 of FIG. 1) may be an electronic device with an extendible display 220 and may include a foldable electronic device, at least a portion of which is foldable with respect to a folding area, a slidable electronic device, at least a portion of which may be linearly moved, and a rollable electronic device, at least a portion of which is rollable. The following description taken in conjunction with FIG. 2A and the subsequent figures may focus primarily on a slidable electronic device according to various example embodiments.

Referring to FIG. 2A, an electronic device 200 may include a housing 210 and a display 220 at least partially surrounded by the housing 210 and having a screen display area exposed.

The housing 210 may denote a structure forming a portion of the front surface, rear surface, and side surfaces of the electronic device. According to an embodiment, the housing 210 may include a front plate forming the front surface of the electronic device, a rear plate forming the rear surface of the electronic device, and side members (or side bezel structures) forming the side surfaces of the electronic device.

According to an embodiment, at least a portion of the front plate may be formed to be substantially transparent and be implemented as, e.g., a glass plate or polymer plate including various coating layers. According to another embodiment, at least a portion of the rear plate may be formed to be substantially opaque and be implemented as, e.g., laminated or colored glass, ceramic, polymer, metal (e.g., aluminum, stainless steel (STS), or magnesium), or a combination of at least two thereof. The side member may be coupled to the front plate and/or the rear plate and be implemented to include a metal and/or polymer. According to an embodiment, the rear plate and the side member may be integrally formed together and include the same material (e.g., a metal, such as aluminum).

The display 220 may be exposed through, e.g., a significant portion of the housing (e.g., the front plate). The display 200 may include, e.g., a first area display 221, a second area display 222, and a third area display 223. For example, the first area display 221, the second area display 222, and the third area display 223 may substantially form one display 220. According to an example embodiment, the display 220 may include a flexible display. According to an embodiment, the edge of the display 220 may be formed to be substantially similar to the shape of the outer edge of the housing. According to another embodiment (not shown), the interval between the outer edge of the display and the outer edge of the front plate may remain substantially even to give a larger area of exposure the display 101. According to an embodiment, the display 220 may form a recess or opening in a portion of the screen display area. At least one or more components of an audio module, a sensor module, a camera module, and a light emitting element may be aligned in the recess or opening. According to another embodiment (not shown), the display 220 may be disposed to be coupled with, or adjacent, a touch detecting circuit, a pressure sensor capable of measuring the strength (pressure) of touches, and/or a digitizer for detecting a magnetic field-type stylus pen.

According to various embodiments, the electronic device 200 may include at least one or more of an audio module, a sensor module, a camera module, a key input device, and a connector hole. According to an embodiment, the electronic device 200 may exclude at least one (e.g., the key input device or the light emitting element) of the components or may add other components.

Figure 2B:
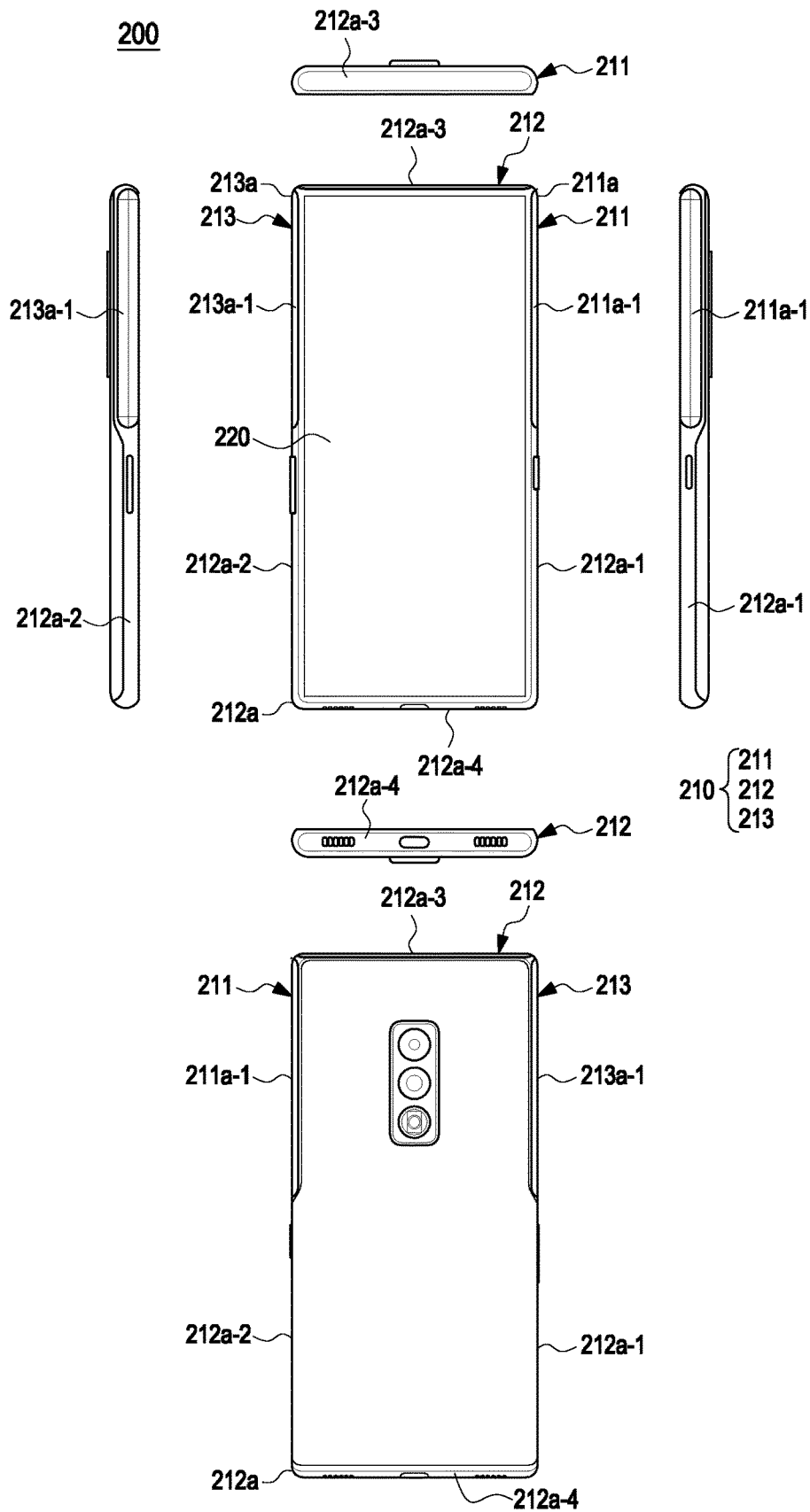
FIG. 2B is a view illustrating an electronic device according to various example embodiments, wherein a portion (e.g., an extendible portion of the display) of a display is received in a second structure.
Figure 2C:
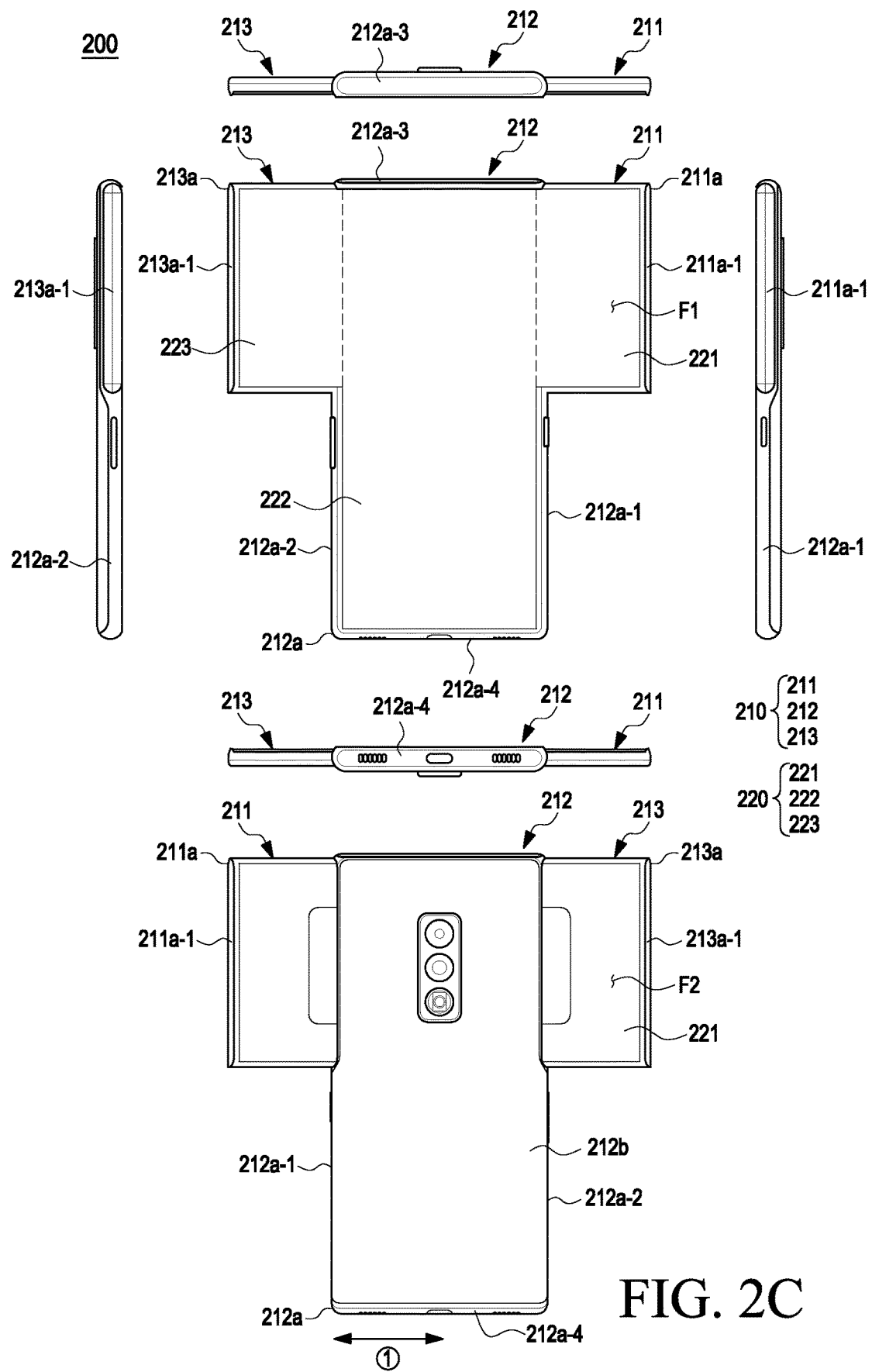
FIG. 2C is a view illustrating an electronic device according to various example embodiments, wherein a portion (e.g., an extendible portion of the display) of a display is exposed to the outside of a second structure.

FIG. 2B is a view illustrating an electronic device 200 according to various example embodiments, wherein a portion (e.g., an extendible portion of the display) of a display 200 is received in a second structure 212. FIG. 2C is a view illustrating an electronic device 200 according to various example embodiments, wherein a portion (e.g., an extendible portion of the display) of a display 200 is exposed to the outside of a second structure 212.

The state shown in FIG. 2B may be defined as a first structure 211 being closed with respect to a second structure 212, and the state shown in FIG. 2C may be defined as the first structure 211 being opened with respect to the second structure 212. According to an embodiment, the "closed state" or "opened state" may be defined as a closed or open state of the electronic device 200. According to an embodiment, the closed state of the electronic device 200 may be defined as a state in which the width of the housing 210 of the electronic device 200 is minimum or small, and the opened state of the electronic device may be defined as a state in which the width of the housing 210 of the electronic device 200 is maximum or high. According to another embodiment, the closed state of the electronic device 200 may be defined as a state in which the area of the externally exposed portion of the display 220 is minimum or small, and the opened state of the electronic device may be defined as a state in which the area of the externally exposed portion of the display 220 is maximum or high.

Referring to FIGS. 2B and 2C, the housing 210 of the electronic device 200 may include a first structure 211 and a second structure 212. In the electronic device 200, the first structure 211 may be disposed to be slidable on the second structure 212. According to an embodiment, the first structure 211 may be disposed to perform reciprocating motion by a predetermined distance in a predetermined direction with respect to the second structure 212, for example, a direction indicated by an arrow ① of FIG. 2C.

According to an embodiment, the first structure 211 may be referred to as, for example, a first housing, a slide unit, or a slide housing, and may be disposed to reciprocate on the second structure 212. The second structure 212 may be referred to as, for example, a second housing, a main part, or a main housing, and may receive various electric or electronic components such as a main circuit board or a battery. The display 220 may be seated on the first structure 211 and the second structure 212. According to an embodiment, a portion of the display 220 may be seated on the first structure 211 and the second structure 212 in a fixed position. Another portion (e.g., the extendible portion of the display) of the display 220 may be received (e.g., slide-in) into the inside of the first structure 211 or second structure 212 or exposed (e.g., slide-out) to the outside of the first structure 211 or second structure 212 as the first structure 211 moves (e.g., slides) relative to the second structure 212. Here, a portion of the display 220 may be a normal use area in the slide-in state of the display 220, and another portion (e.g., the extendible portion of the display) of the display 220 may be an extended area in the slide-out state. FIG. 2B illustrates an embodiment in which the normal use area in the slide-in state of the display 220 is seated on the second structure 212. FIG. 2C illustrates an embodiment in which the normal use area and the extended area of the display in the slide-out state of the display 220 are seated on the second structure 212 and the first structure 211, respectively.

According to various embodiments, the first structure 211 may include a first plate 211a (e.g., a slide plate) and be formed to include at least a portion of the first plate 211a and may include a first surface (e.g., F1 of FIG. 2C) facing in a first direction (e.g., the Z direction of FIG. 1) and a second surface (e.g., F2 of FIG. 2C) facing opposite to the first surface F1. According to various embodiments, the second structure 212 may include a second plate 212a and may include a first sidewall 212a-1 extending from the second plate 212a, a second sidewall 212a-2 facing opposite to the first sidewall 212a-1, a third sidewall 212a-3 extending from the second plate 212a and facing in a direction (e.g., an orthogonal direction) different from the first sidewall 212a-1 and the second sidewall 212a-2, a fourth sidewall 212a-4 facing opposite to the third sidewall 212a-3, and/or a rear plate 212b (e.g., a rear window). In an embodiment, the first sidewall 212a-1, the second sidewall 212a-2, the third sidewall 212a-3, and the fourth sidewall 212a-4, respectively, define side surfaces facing in four different directions in a rectangular structure. For example, the first sidewall 212a-1 may define a first side surface, the second sidewall 212a-2 may define a second side surface facing opposite to the first side surface, the third sidewall 212a-3 may define a third side surface perpendicular to the first side surface and the second side surface, and the fourth sidewall 212a-4 may define a fourth side surface facing opposite to the third side surface.

According to various embodiments, at least one component among the second plate 212a, the first sidewall 212a-1, the second sidewall 212a-2, the third sidewall 212a-3, the fourth sidewall 212a-4, and/or the rear plate 212b of the second structure 212 may be formed to surround the first plate 211a of the first structure 211. According to various embodiments, the first sidewall 212a-1, the second sidewall 212a-2, the third sidewall 212a-3, the fourth sidewall 212a-4, and/or the rear plate 212b may be substantially integrally formed. According to an embodiment, as shown in FIGS. 2B and 2C, the first sidewall 212a-1, the third sidewall 212a-3, and the rear plate 212b may be formed to receive (or surround) at least a portion of the first structure 211. The second structure 212 may be formed so that a portion (e.g., the front surface) of the second structure 212, surrounded by the first sidewall 212a-1, the second sidewall 212a-2, the third sidewall 212a-3, and the fourth sidewall 212a-4, is opened and receive the display 220 through the portion. Further, as the second structure 212 is formed so that at least a portion (e.g., the first side surface) of the first sidewall 212a-1 is opened, the first structure 211 may be received inside the second structure 212 or projected to the outside of the second structure 212 through a slide-in or slide-out.

According to various embodiments, the first structure 211 may be coupled to the second structure 212 in a state of being at least partially surrounded by the second structure 212 and be slid linearly along a direction parallel to, e.g., the arrow ① direction of FIG. 2C while being guided by the second structure 212.

According to various embodiments, the first structure 211 may include a fifth sidewall 211a-1 extending from the first plate 211a, a sixth sidewall 211a-3 extending from the first plate 211a and facing in a direction (e.g., an orthogonal direction) different from the fifth sidewall 211a-1, and a seventh sidewall 211a-7 extending from the first plate 211a and facing in a direction opposite to the sixth sidewall 211a-3. According to various embodiments, the fifth sidewall 211a-1 may be disposed side-by-side to the first sidewall 212a-1 of the second structure 212 in the same direction (e.g., the X direction of FIG. 1) on a straight line in the state in which the first structure 211 is received in the second structure 212 (or in the "closed state" of the electronic device) and, when the first structure 211 is slid out to the outside of the second structure 212 (or in the "opened state" of the electronic device), form a step from the first sidewall 212a-1 of the second structure 212. According to various embodiments, the second sidewall 211a-3 and the seventh sidewall 211a-4 may be surrounded by the second structure 212 to be invisible to the outside in the state in which the first structure 211 is received in the second structure 212 (or in the "closed state" of the electronic device) and, when the first structure 211 is slid out to the outside of the second structure 212 (or in the "opened state" of the electronic device), be exposed to the outside.

In the embodiment shown in FIGS. 2B and 2C, a shape of the first structure 211 is shown in which when the first structure 211 is slid out to the outside of the second structure 212 (or in the "opened state" of the electronic device), the second sidewall 211a-3 is disposed side-by-side to the third sidewall 212a-3 of the second structure 212 in the same direction (e.g., the Y direction of FIG. 1) on a straight line, but is not limited thereto. For example, as shown in FIGS. 2B and 2C, the first structure 211 may be disposed in a position adjacent to the third sidewall 212a-3 of the electronic device 200 but, in contrast, be disposed in a position spaced apart from the third sidewall 212a-3 by a predetermined distance. In other words, according to the embodiment shown in FIGS. 2B and 2C, when the first structure 211 is slid out to the outside of the second structure 212 (or in the "opened state" of the electronic device), the overall shape of the electronic device 200 may be "⌐" but is not limited thereto. Unlike the embodiment shown in FIGS. 2B and 2C, the entire shape of the electronic device 200 may be "⌐" or "⌐" depending on the position of the first structure 211. As described above, various shapes of the electronic device are described below in detail with reference to FIG. 2D.

According to various example embodiments, the housing 210 of the electronic device 200 may further include a third structure 213. The third structure 213 may be disposed to be slidable on the second structure 212 according to the same operation principle as the first structure 211. According to an embodiment, the third structure 213 may be disposed to perform reciprocating motion by a predetermined distance in a predetermined direction with respect to the second structure 212, for example, a direction indicated by an arrow ② of FIG. 2C.

According to an embodiment, the third structure 211 may be referred to as, for example, a third housing, a slide unit, or a slide housing, and may be disposed to reciprocate on the second structure 212. The display 220 may be seated on the first structure 211. According to an embodiment, a portion of the display 220 may be seated on the second structure 212 and the third structure 213 in a fixed position. Another portion (e.g., the extendible portion of the display) of the display 220 may be received (e.g., slide-in) into the inside of the second structure 213 or third structure 213 or exposed (e.g., slide-out) to the outside of the second structure 212 or third structure 213 as the third structure 213 moves (e.g., slides) relative to the second structure 212. FIG. 2C illustrates an embodiment in which the normal use area and the extended area of the display in the slide-out state of the display 220 are seated on the second structure 212, and the first structure 211 and the third structure 213, respectively.

According to various embodiments, the third housing 213 may include a third plate 213a (e.g., a slide plate). According to various embodiments, at least one component among the second plate 212a, the first sidewall 212a-1, the second sidewall 212a-2, the third sidewall 212a-3, the fourth sidewall 212a-4, and/or the rear plate 212b of the second structure 212 may be formed to surround the third plate 213a of the first structure 211. According to an embodiment, as shown in FIGS. 2B and 2C, the first sidewall 212a-1, the third sidewall 212a-3, and the rear plate 212b may be formed to receive (or surround) at least a portion of the third structure 213.

According to various embodiments, the third structure 213 may be coupled to the second structure 212 in a state of being at least partially surrounded by the second structure 212 and be slid linearly along a direction parallel to, e.g., the arrow ② direction of FIG. 2C while being guided by the second structure 212.

According to various embodiments, the third structure 213 may include an eight sidewall 213a-1 extending from the third plate 211a, a ninth sidewall 213a-3 extending from the third plate 211a and facing in a direction (e.g., an orthogonal direction) different from the eighth sidewall 213a-1, and a tenth sidewall 213a-4 extending from the third plate 213a and facing in a direction opposite to the ninth sidewall 213a-3. According to various embodiments, the eighth sidewall 213a-1 may be disposed side-by-side to the second sidewall 212a-2 of the second structure 212 in the same direction (e.g., direction opposite to the X direction of FIG. 1) on a straight line in the state in which the third structure 213 is received in the second structure 212 (or in the "closed state" of the electronic device) and, when the third structure 211 is slid out to the outside of the second structure 212 (or in the "opened state" of the electronic device), form a step from the second sidewall 212a-2 of the second structure 212. According to various embodiments, the ninth sidewall 213a-3 and the tenth sidewall 213a-4 may be surrounded by the second structure 212 to be invisible to the outside in the state in which the third structure 213 is received in the second structure 212 (or in the "closed state" of the electronic device) and, when the third structure 213 is slid out to the outside of the second structure 212 (or in the "opened state" of the electronic device), be exposed to the outside.

Additionally or alternatively to the slide of the first structure 211, a slide of the third structure 213 may be implemented. According to an embodiment, when the first structure 211 is exposed to the outside of the second structure 212, the third structure 213 may be received in the second structure 212 and, according to another embodiment, when the first structure 211 is received in the second structure 212, the third structure 213 may be exposed to the outside of the second structure 212. According to another embodiment, when the first structure 211 is exposed to the outside of the second structure 212, the third structure 213 may also be exposed to the outside of the second structure 212. According to various embodiments, the slide of the first structure 211 and/or the slide of the third structure 213 may be performed manually by the user or automatically under the control of a processor (e.g., the processor 120 of FIG. 1) in the electronic device 200. In this case, the slide of the first structure 211 and the slide of the third structure 213 may be implemented individually/independently or simultaneously.

A shape of the third structure 213 is shown in which when the third structure 213 is slid out to the outside of the second structure 212 (or in the "opened state" of the electronic device), the ninth sidewall 213a-3 is disposed side-by-side to the third sidewall 212a-3 of the second structure 212 in the same direction (e.g., the Y direction of FIG. 3) on a straight line, but is not limited thereto. For example, as shown in FIGS. 2B and 2C, the third structure 213 may be disposed in a position adjacent to the third sidewall 212a-3 of the electronic device 200 but, in contrast, be disposed in a position spaced apart from the third sidewall 212a-3 by a predetermined distance. In other words, according to the embodiment shown in FIGS. 2B and 2C, when the third structure 213 is slid out to the outside of the second structure 212 (or in the "opened state" of the electronic device), the overall shape of the electronic device 200 may be "⌐" but is not limited thereto. Unlike the embodiment shown in FIGS. 2B and 2C, the entire shape of the electronic device 200 may be "⌐" or "¬" depending on the position of the first structure 211. According to various embodiments, when the third structure 213 slides simultaneously with the first structure 211, the overall shape may be "T" or "+" or "⊥".

As described above, various shapes of the electronic device are described below in detail with reference to FIG. 2D.

Figure 2D:
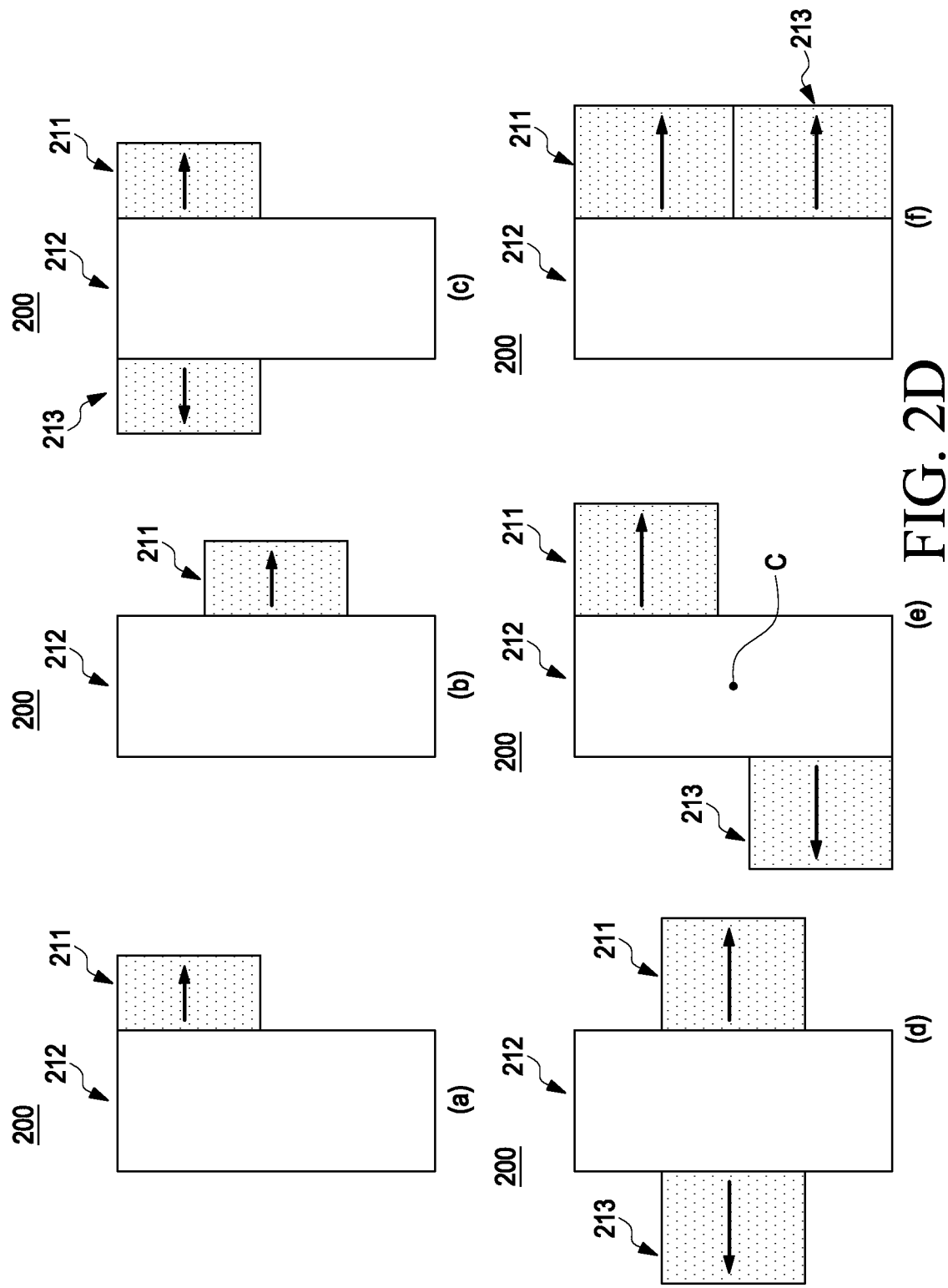
FIG. 2D is a view illustrating various examples of slides of a first structure and a third structure with respect to a second structure according to various example embodiments.

FIG. 2D is a view illustrating various examples of slides of a first structure 211 and a third structure 213 with respect to a second structure 212 according to various example embodiments.

According to various embodiments, an electronic device 200 may include a first structure 211 and a third structure 213 slidable with respect to a second structure 212.

Referring to the embodiment shown in (a) of FIG. 2D, the first structure 211 may slide in a direction in which the width of the electronic device increases, from an upper end of one side surface of the second structure 212. In contrast, referring to the embodiment shown in (b) of FIG. 2D, the first structure 211 may slide in a direction in which the width of the electronic device increases, from a center portion of one side surface of the second structure 212. Although not shown in the drawings, the first structure 211 may slide in a direction in which the width of the electronic device increases, from a lower end of one side surface of the second structure 212.

Referring to the embodiment shown in (c) of FIG. 2D, the first structure 211 and the third structure 213 may slide in a direction in which the width of the electronic device increases, from upper ends of one side surface and the other side surface of the second structure 212. In contrast, referring to the embodiment shown in (d) of FIG. 2D, the first structure 211 and the third structure 213 may slide in a direction in which the width of the electronic device increases, from center portions of one side surface and the other side surface of the second structure 212. Although not shown in the drawings, the first structure 211 and the third structure 213 may slide in a direction in which the width of the electronic device increases, from a lower end of one side surface of the second structure 212.

According to various embodiments, the first structure 211 and the third structure 213 may slide in opposite directions with respect to the second structure 212. (c) of FIG. 2D and (d) of FIG. 2D disclose an embodiment in which the first structure 211 and the third structure 213 slide left/right symmetrically with respect to the second structure 212. Alternatively, referring to (e) of FIG. 2D, the first structure 211 and the third structure 213 may be disposed point-symmetrically with respect to the center C of the electronic device 200. However, the disclosure is not limited to the above-described embodiments. Although not shown in the drawings, the first structure 211 and the third structure 213 may be disposed in their asymmetric positions with respect to the second structure 212.

According to various embodiments, as shown in (f) of FIG. 2D, the first structure 211 and the third structure 213 may be formed to be slidable side-by-side in the same direction from one side surface of the second structure 212.

In the electronic device 200 including the first structure 211, the second structure 212, and the third structure 213, the disclosure may provide an electronic device 200 slidable in various manners. For example, the foregoing description made in connection with FIG. 2D focuses primarily on an embodiment in which the first structure 211 and the second are slidable in the second direction (e.g., the X-axis direction of FIG. 1) from the second structure 212. However, without limitations thereto, it should be noted that an electronic device 200 in which the first structure 211 and/or the third structure 213 is slidable from the second structure 212 in a third direction (e.g., the Y-axis direction of FIG. 1) may also be included in the scope.

Figure 3:
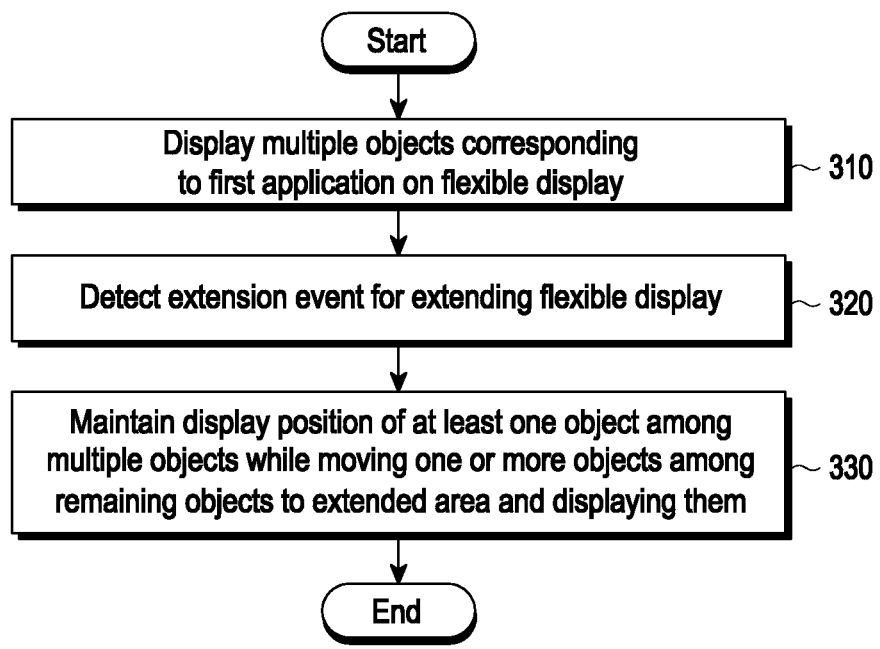
FIG. 3 is a view illustrating an example of a function or operation of moving and displaying some objects displayed on an electronic device according to an extension of a flexible display in the electronic device according to an example embodiment.

FIG. 3 is a view illustrating an example of a function or operation of moving and displaying some objects displayed on an electronic device 101 according to an extension of a flexible display (e.g., the display module 160 of FIG. 1) in the electronic device 101 according to an example embodiment.

Referring to FIG. 3, according to an example embodiment, in operation 310, the electronic device 101 may display a plurality of objects corresponding to a first application on the flexible display. According to an example embodiment, the plurality of objects may include, e.g., a view (e.g., screen) displayed on a lowest layer of the execution screen of the first application, a view (e.g., screen) displayed on a middle layer of the execution screen of the first application, a view (e.g., screen) which is a combination of the view displayed on the lowest layer and the view displayed on the middle layer, various graphical elements overlaid and displayed on the view displayed on the lowest layer, middle layer, or combined layer, and/or various graphical elements displayed on the highest layer. According to an example embodiment, operation 310 may be understood by one of ordinary skill in the art simply as a function or operation of displaying the execution screen of the first application. According to an example embodiment, the flexible display may be substantially in a non-extended state (e.g., substantially closed state) while performing operation 310. In other words, a state in which the flexible display is extended partially to have a space insufficient to display a specific object may be understood by one of ordinary skill in the art as the non-extended state.

According to an example embodiment, in operation 320, the electronic device 101 may detect an extension event for extending the flexible display. According to an example embodiment, the electronic device 101 may be extended in the shape of T. According to an example embodiment, the extension event may include a user input to press a button for extending the flexible display provided in the electronic device 101. According to an example embodiment, the extension event may include the user's action to draw out an upper end of the flexible display in any one direction or two opposite directions. In this case, according to an example embodiment, the electronic device 101 may detect the degree of rotation of a rolling unit provided in the electronic device 101 to determine how much the flexible display is extended.

According to an example embodiment, in operation 330, the electronic device 101 may maintain the position of display of at least one object (e.g., the view displayed on the lowest layer) among the plurality of objects while moving other remaining objects (e.g., the graphical elements overlaid and displayed on the view) among the plurality of objects to the extended area and displaying them.

FIGS. 4A, 4B, 5A, and 5B are views illustrating an example of a function or operation as shown in FIG. 3.

Figure 4A:
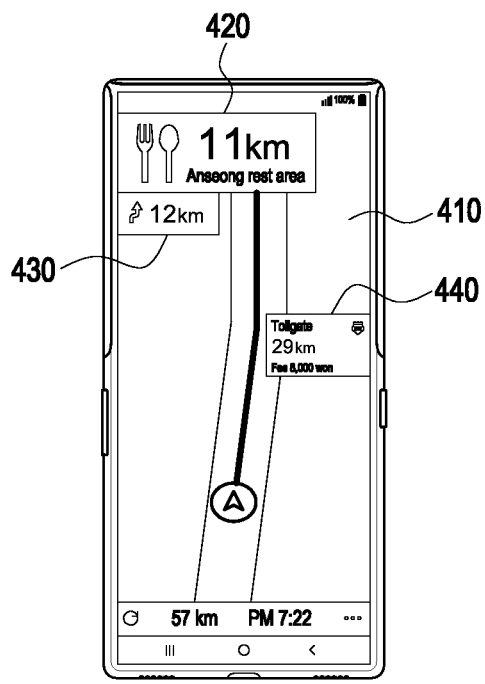
FIGS. 4A, 4B, 5A, and 5B are views illustrating an example of a function or operation as shown in FIG. 3.
Figure 4B:
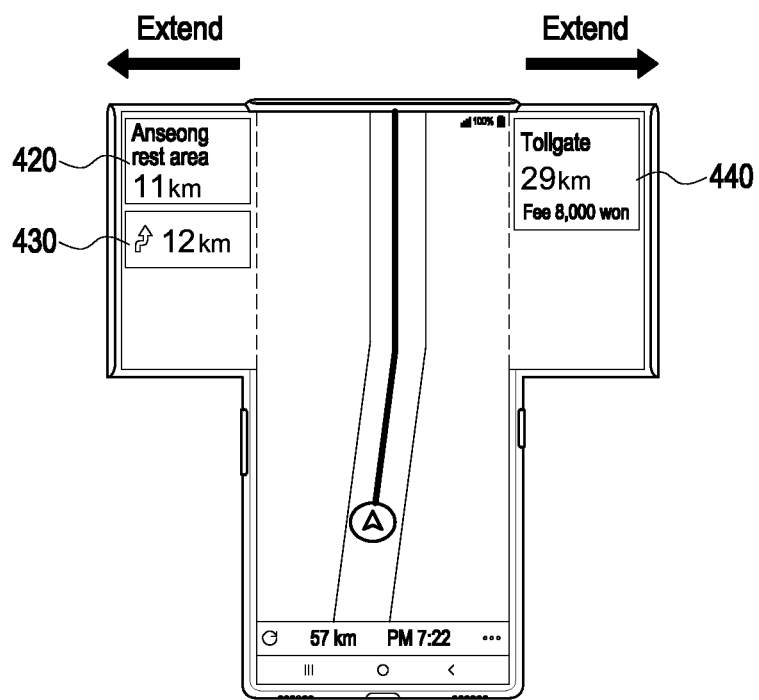

Referring to FIGS. 4A and 4B, according to an example embodiment, the electronic device 101 may display a first object 410 (e.g., the view displayed on the lowest layer), a second object 420, a third object 430, and a fourth object 440 on the electronic device 101. According to an example embodiment, the second object 420, the third object 430, and the fourth object 440 may be overlaid and displayed on the first object 410. FIG. 4A exemplarily illustrates an embodiment in which the execution screen (e.g., the first object 410) (e.g., the view displayed on the lowest layer), the second object 420, the third object 430, and the fourth object 440) of the first application is displayed in a portrait orientation. Referring to FIG. 4B, according to an example embodiment, the electronic device 101 may extend the flexible display according to detection of an extension event. According to an example embodiment, as shown in FIG. 4B, the electronic device 101 may display the second object 420, the third object 430, and the fourth object 440 on the extended area. In this case, the objects (e.g., the second object 420, the third object 430, and the fourth object 440) may be resized and displayed depending on the size of the extended area.

Figure 5A:
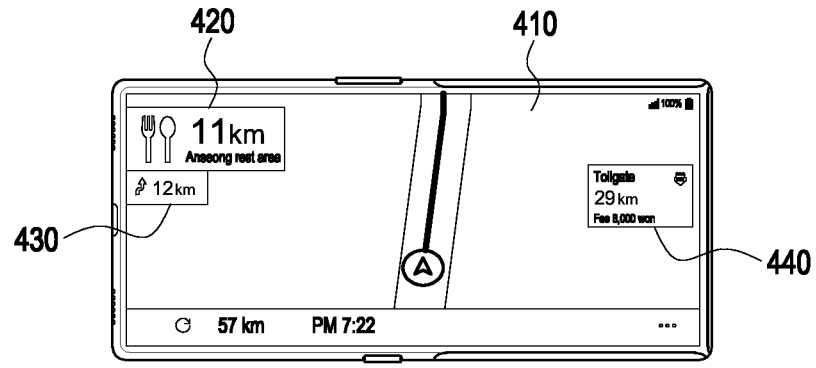
Figure 5B:
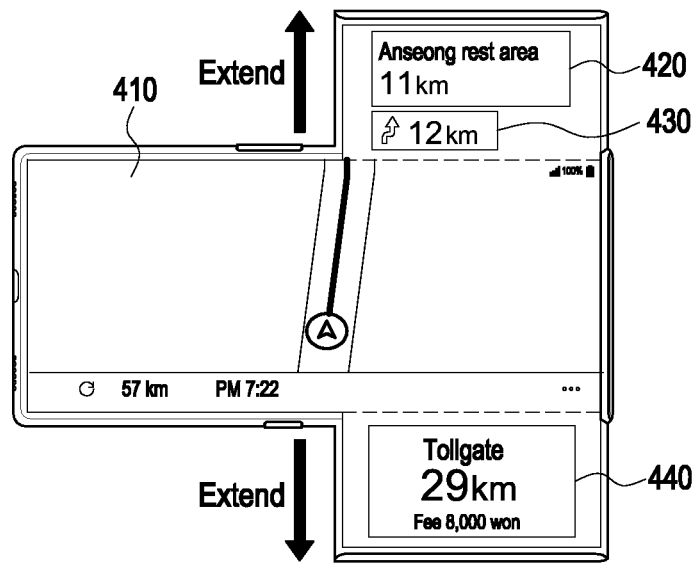

Referring to FIGS. 5A and 5B, according to an example embodiment, the electronic device 101 may display a first object 410 (e.g., the view displayed on the lowest layer), a second object 420, a third object 430, and a fourth object 440 on the electronic device 101. According to an example embodiment, the second object 420, the third object 430, and the fourth object 440 may be overlaid and displayed on the first object 410. FIG. 5A exemplarily illustrates an embodiment in which the execution screen (e.g., the first object 410) (e.g., the view displayed on the lowest layer), the second object 420, the third object 430, and the fourth object 440) of the first application is displayed in a landscape orientation. Referring to FIG. 5B, according to an example embodiment, the electronic device 101 may extend the flexible display according to detection of an extension event. According to an example embodiment, as shown in FIG. 5B, the electronic device 101 may display the second object 420, the third object 430, and the fourth object 440 on the extended area.

Figure 6:
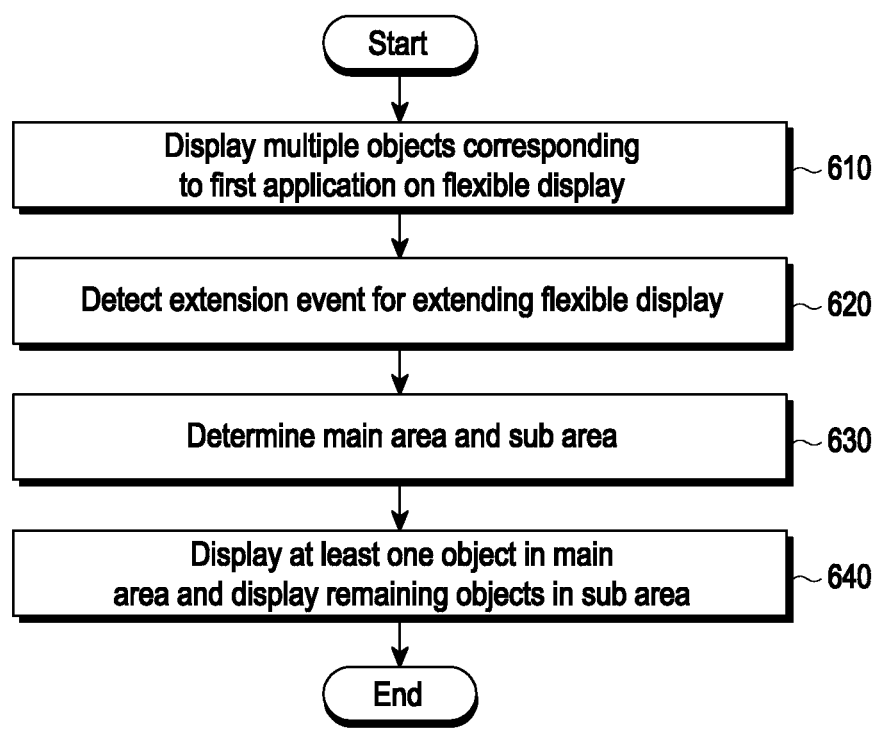
FIG. 6 is a view illustrating an example of a function or operation of determining a main area and a sub area according to an attribute of an application and moving and displaying some objects displayed on an electronic device to the sub area according to an example embodiment.

FIG. 6 is a view illustrating an example of a function or operation of determining a main area and a sub area according to an attribute of an application and moving and displaying some objects displayed on an electronic device to the sub area according to an example embodiment.

Referring to FIG. 6, according to an example embodiment, in operation 610, the electronic device 101 may display a plurality of objects corresponding to a first application on the flexible display. According to an example embodiment, the plurality of objects corresponding to the first application may include, e.g., a view (e.g., screen) displayed on a lowest layer of the execution screen of the first application, a view (e.g., screen) displayed on a middle layer of the execution screen of the first application, various graphical elements overlaid and displayed on the view displayed on the lowest layer or middle layer, and/or various graphical elements displayed on the highest layer. According to an example embodiment, operation 610 may be understood by one of ordinary skill in the art as a function or operation of displaying the execution screen of the first application. According to an example embodiment, the flexible display may be substantially in a non-extended state (e.g., substantially closed state) while performing operation 610. In other words, a state in which the flexible display is extended partially to have a space insufficient to display a specific object may be understood by one of ordinary skill in the art as the non-extended state.

According to an example embodiment, in operation 620, the electronic device 101 may detect an extension event for extending the flexible display. According to an example embodiment, the electronic device 101 may be extended in the shape of T. According to an example embodiment, the extension event may include a user input to press a button for extending the flexible display provided in the electronic device 101. According to an example embodiment, the extension event may include the user's action to draw out an upper end of the flexible display in any one direction or two opposite directions. In this case, according to an example embodiment, the electronic device 101 may detect the degree of rotation of a rolling unit provided in the electronic device 101 to determine how much the flexible display is extended.

According to an example embodiment, in operation 630, the electronic device 101 may determine a main area and a sub area. According to an example embodiment, the main area 710 may indicate, e.g., an area where the screen except for at least one graphical element among the graphical elements displayed on the highest layer of the execution screen of a specific application is displayed. Or, according to an example embodiment, the main area 710 may indicate an area where a screen except for at least one graphical element among the graphical elements identifiable by the user since certain overlaid elements are not displayed on a higher layer although not displayed on the highest layer is displayed. Or, according to an example embodiment, the main area may simply indicate an area where the screen displayed on the lowest layer is displayed when the execution screen of a specific application is constituted of two layers. In some embodiments of the disclosure, for convenience of description, the first object 410 is displayed on the lowest layer, and the second object 420, the third object 430, and the fourth object 440 are displayed to overlay the first object 410 on the same layer. According to an example embodiment, the sub area 720 may indicate, e.g., an area where at least one graphical element (e.g., the second object 420, the third object 430, and/or the fourth object 440) is displayed on the highest layer of the execution screen of a specific application. According to an example embodiment, the sub area may be a plurality of areas or a single area.

According to an example embodiment, in operation 640, the electronic device 101 may display at least one object (e.g., the first object 410) in the main area 710 and the remaining objects (e.g., the second object 420, the third object 430, and the fourth object 440) in the sub area 720. According to an example embodiment, the remaining objects (e.g., the second object 420, the third object 430, and the fourth object 440) displayed on the highest layer may be displayed in the sub area 720.

FIGS. 7A, 7B, 7C, 7D, 8A, 8B, 8C, 9A, 9B, and 9C are views illustrating an example of a function or operation as shown in FIG. 6.

Figure 7A:
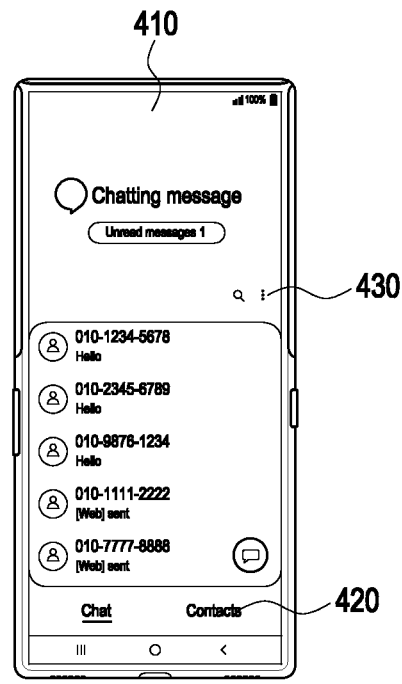
FIGS. 7A, 7B, 7C, 7D, 8A, 8B, 8C, 9A, 9B, and 9C are views illustrating an example of a function or operation as shown in FIG. 6.
Figure 7B:
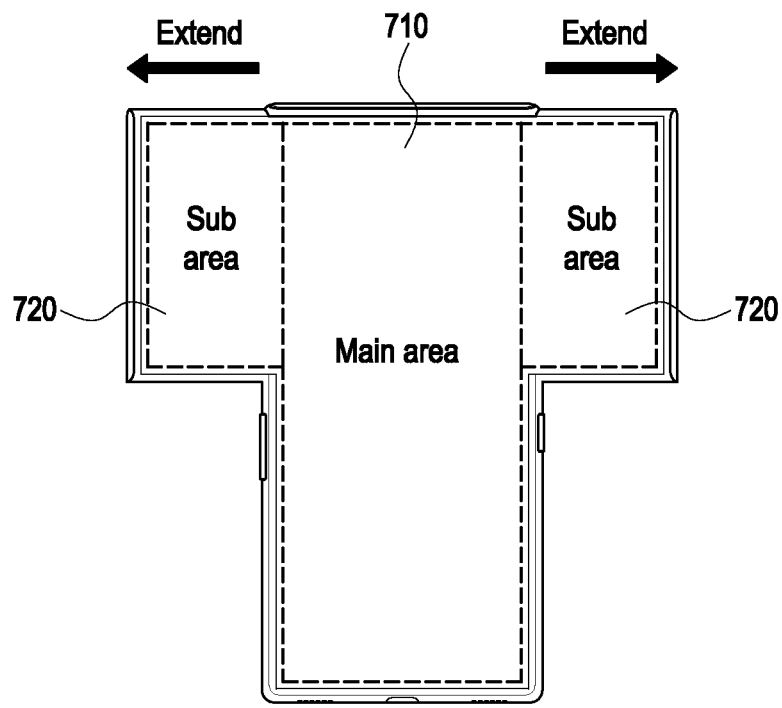
Figure 7C:
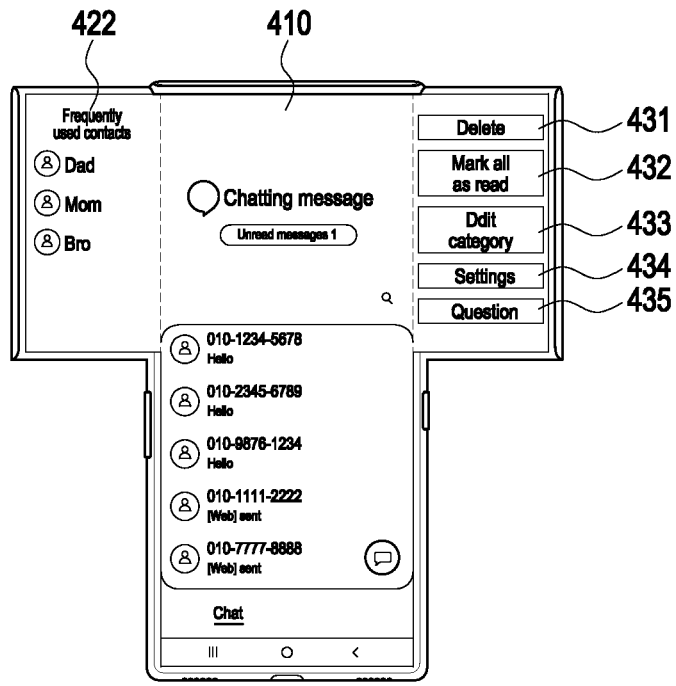
Figure 7D:
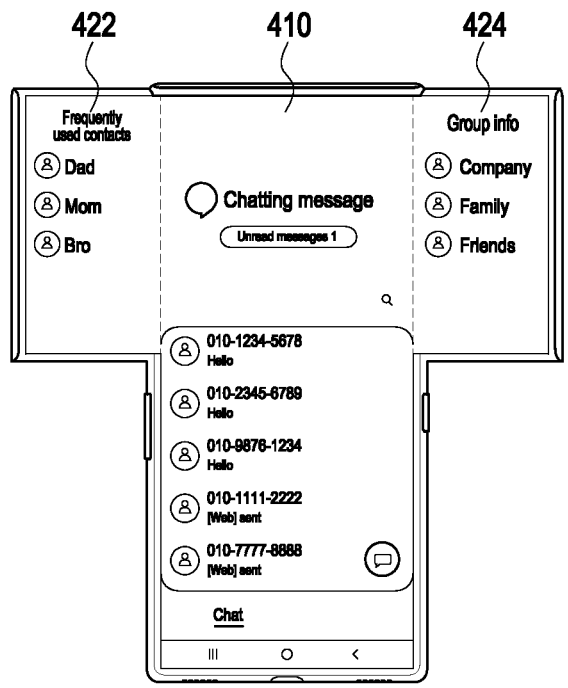

Referring to FIG. 7A, according to an example embodiment, the electronic device 101 may display the execution screen of a specific application (e.g., message application) on the flexible display. According to an example embodiment, the execution screen of the specific application may include a screen (e.g., the first object 410) displayed on a lower layer and graphical elements (e.g., the second object 420 and the third object 430) displayed to overlay the screen on a higher layer than the screen. Referring to FIG. 7B, according to an example embodiment, the electronic device 101 may detect an extension event and extend the flexible display in the shape of T. According to an example embodiment, upon detecting an extension event, the electronic device 101 may determine the main area 710 and the sub area 720. According to an example embodiment, the electronic device 101 may determine the main area 710 and the sub area 720 based on an attribute of the application being displayed on the flexible display. According to an example embodiment, the attribute of the application may include, e.g., whether the execution screen of the application is an application optimized for the portrait orientation or an application optimized for the landscape orientation. According to an example embodiment, the attribute of the application may be determined previously (e.g., before the application is installed on the electronic device 101 or at the time of creating the application). FIG. 7B illustrates an example in which the attribute of the specific application (e.g., message application) is an application optimized for the portrait orientation. Accordingly, according to an example embodiment, the electronic device 101 may determine the main area 710 as shown in FIG. 7B. According to an example embodiment, the electronic device 101 may determine that in the extended flexible display, the rest of the main area 710 is the sub area 720. Referring to FIG. 7C, according to an example embodiment, the electronic device 101 may display only the first object 410 (e.g., the screen displayed on a lower layer than the second object 420 and the third object 430) in the main area 710 and display a sub menu 422 (e.g., "frequently used contacts") of the second object 420 and sub menus (e.g., a first sub menu 431, a second sub menu 432, a third sub menu 433, a fourth sub menu 434, and a fifth sub menu 435) of the third object 430 in the sub area 720. Or, as shown in FIG. 7D, only the first object 410 (e.g., the screen displayed on a lower layer than the second object 420 and the third object 430) may be displayed in the main area 710, and sub menus (e.g., a sixth sub menu 422 and a seventh sub menu 424) of the second object 420 may be displayed in the sub area 720. However, according to an example embodiment, display of at least one object (e.g., the "chat" item in FIG. 7C) among the objects displayed on the higher layer than the first object 410 may be maintained. In other words, the display state of the object (e.g., the "chat" item in FIG. 7C) not displayed in the sub area 720 may be displayed in the main area 710 although the object (e.g., the "chat" item in FIG. 7C) not displayed in the sub area 720 is displayed on the highest layer.

Figure 8A:
Figure 8B:
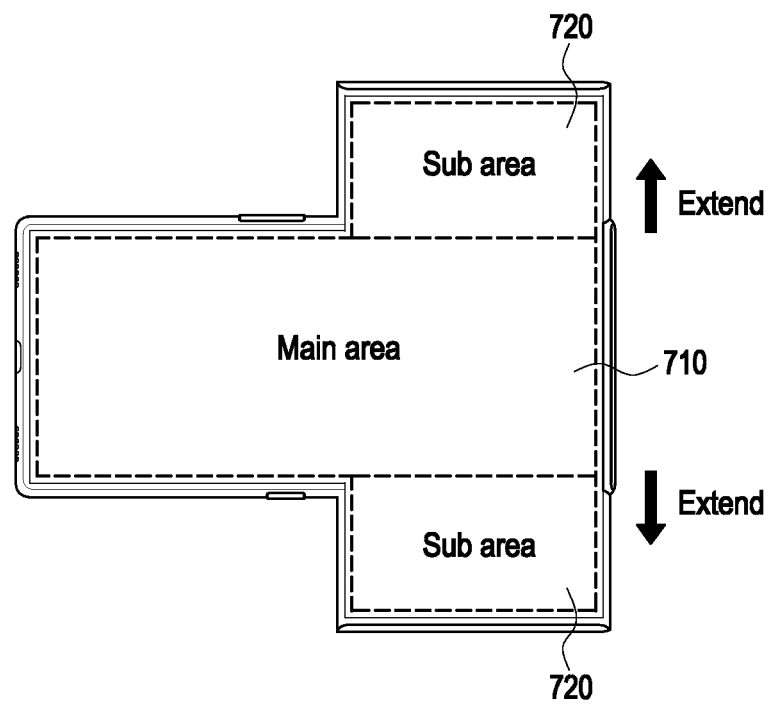
Figure 8C:
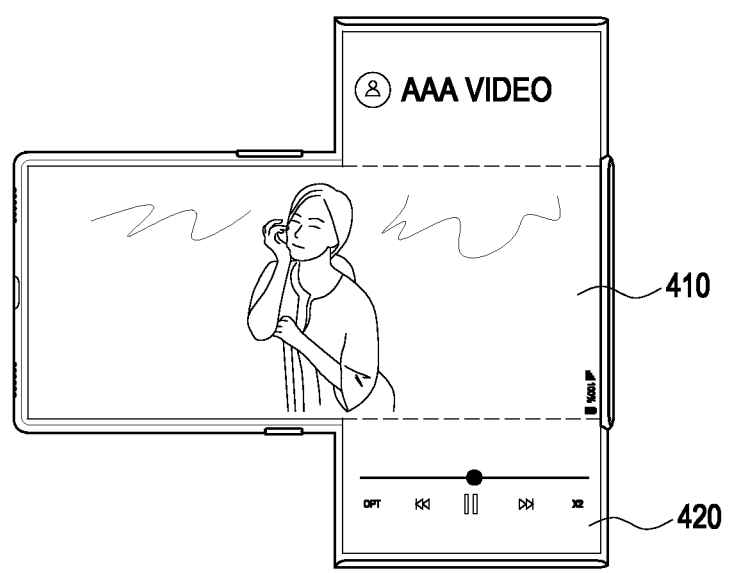

Referring to FIG. 8A, according to an example embodiment, the electronic device 101 may display the execution screen of a specific application (e.g., message application) on the flexible display. According to an example embodiment, the execution screen of the specific application may include a screen (e.g., the first object 410) displayed on a lower layer and a graphical element (e.g., the second object 420) displayed to overlay the screen on a higher layer than the screen. Referring to FIG. 8B, according to an example embodiment, the electronic device 101 may detect an extension event and extend the flexible display. According to an example embodiment, upon detecting an extension event, the electronic device 101 may determine the main area 710 and the sub area 720. FIG. 8B illustrates an example in which the attribute of the specific application (e.g., message application) is an application optimized for the landscape orientation. Accordingly, according to an example embodiment, the electronic device 101 may determine the main area 710 as shown in FIG. 8B. According to an example embodiment, the electronic device 101 may determine that in the extended flexible display, the rest of the main area 710 is the sub area 720. Referring to FIG. 8C, according to an example embodiment, the electronic device 101 may display only the first object 410 (e.g., the screen displayed on a lower layer than the second object 420) in the main area 710 and display the second object 420 and additional information (e.g., title information) about the video being played on the electronic device 101 in the sub area 720.

Figure 9A:
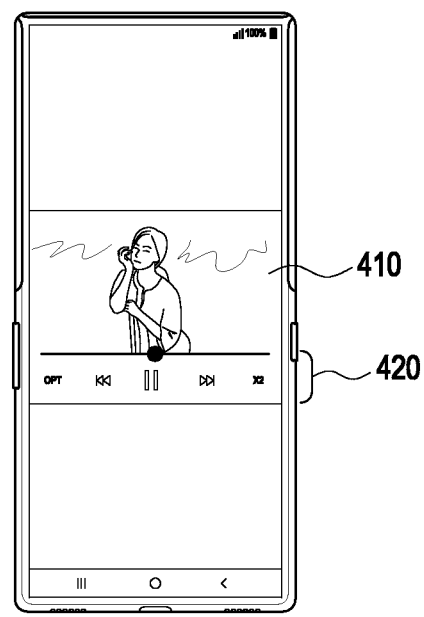
Figure 9B:
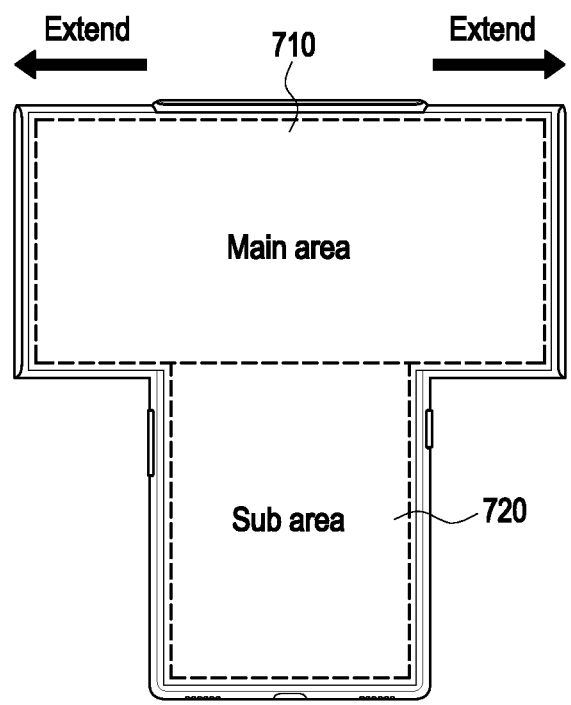
Figure 9C:
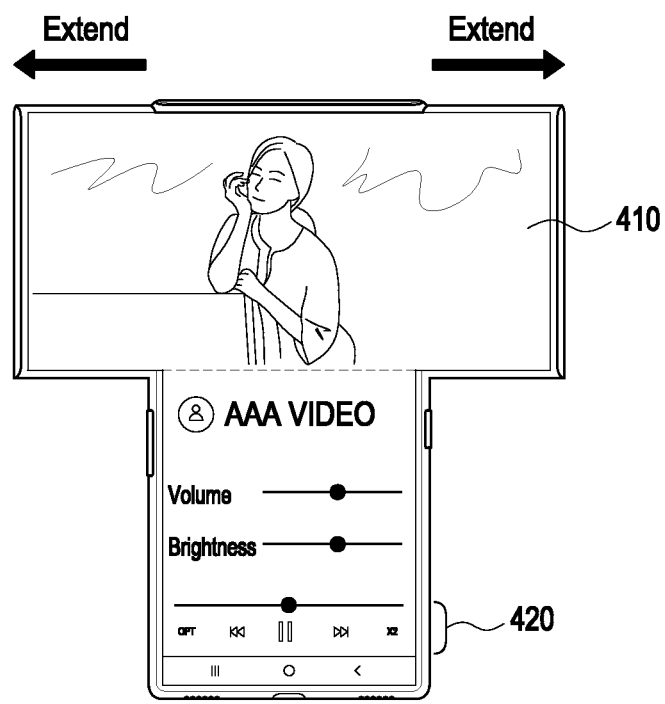

Referring to FIG. 9A, according to an example embodiment, the electronic device 101 may display the execution screen of a specific application (e.g., message application) on the flexible display. According to an example embodiment, the execution screen of the specific application may include a screen (e.g., the first object 410) displayed on a lower layer and a graphical element (e.g., the second object 420) displayed to overlay the screen on a higher layer than the screen. However, FIG. 9A illustrates an example in which video is played when the electronic device 101 is in the portrait orientation unlike that shown in FIG. 8A. According to an example embodiment, since the specific application (e.g., video playback application) is an application optimized for the landscape orientation, the electronic device 101 may determine the main area 710 and the sub area 720 as shown in FIG. 9B. According to an example embodiment, as shown in FIG. 9C, the electronic device 101 may display the first object 410 in the main area 710 and display the second object 420, additional information (e.g., title information) about the playing video, and items (e.g., volume control item and brightness control item) for controlling the playing video.

Figure 10:
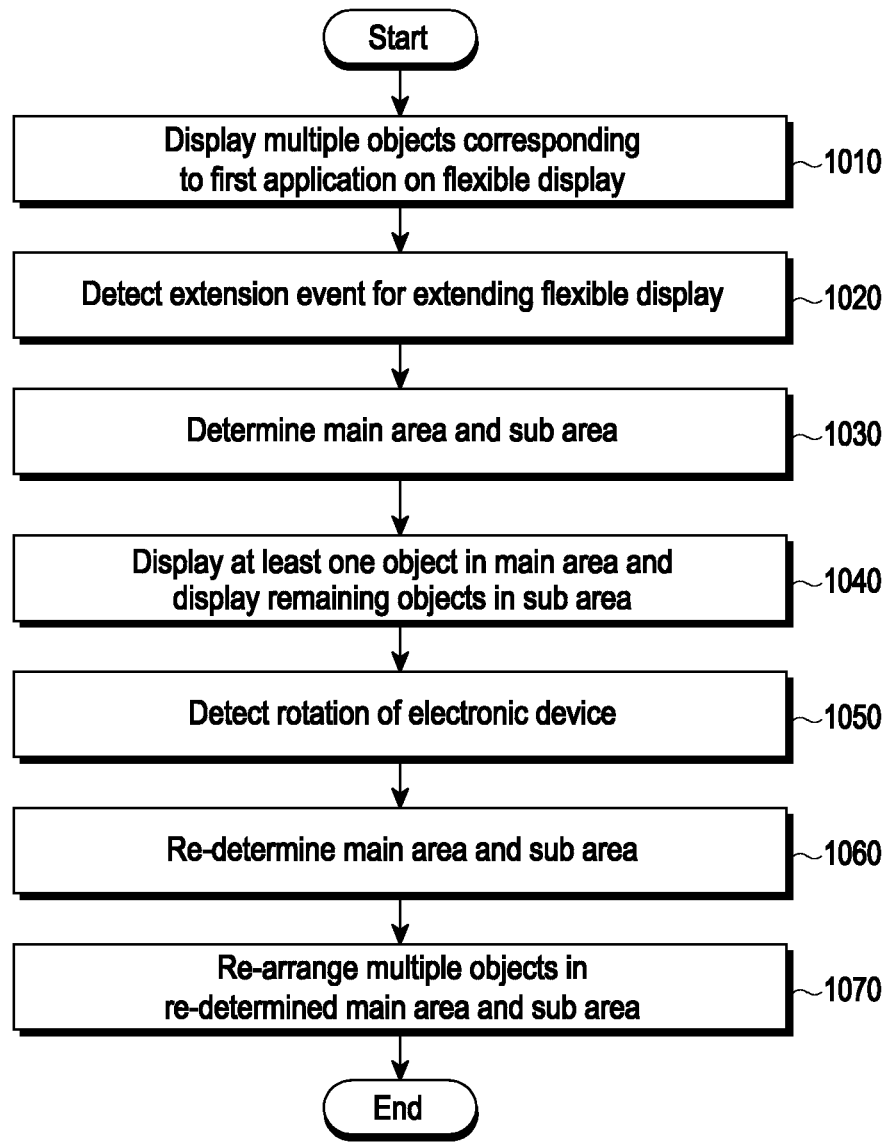
FIG. 10 is a view illustrating an example of a function or operation of re-determining a main area and a sub area and displaying at least one object in the re-determined main area and sub area, respectively, by an electronic device when the electronic device is rotated according to an example embodiment.

FIG. 10 is a view illustrating an example of a function or operation of re-determining a main area and a sub area and displaying at least one object in the re-determined main area and sub area, respectively, by an electronic device when the electronic device is rotated according to an example embodiment.

Referring to FIG. 10, according to an example embodiment, in operation 1010, the electronic device 101 may display a plurality of objects corresponding to a first application on the flexible display. According to an example embodiment, the plurality of objects corresponding to the first application may include, e.g., a view (e.g., screen) displayed on a lowest layer of the execution screen of the first application, a view (e.g., screen) displayed on a middle layer of the execution screen of the first application, various graphical elements overlaid and displayed on the view displayed on the lowest layer or middle layer, and/or various graphical elements displayed on the highest layer. According to an example embodiment, operation 1010 may be understood by one of ordinary skill in the art as a function or operation of displaying the execution screen of the first application. According to an example embodiment, the flexible display may be substantially in a non-extended state (e.g., substantially closed state) while performing operation 1010. In other words, a state in which the flexible display is extended partially to have a space insufficient to display a specific object may be understood by one of ordinary skill in the art as the non-extended state.

According to an example embodiment, in operation 1020, the electronic device 101 may detect an extension event for extending the flexible display. According to an example embodiment, the electronic device 101 may be extended in the shape of T. According to an example embodiment, the extension event may include a user input to press a button for extending the flexible display provided in the electronic device 101. According to an example embodiment, the extension event may include the user's action to draw out an upper end of the flexible display in any one direction or two opposite directions. In this case, according to an example embodiment, the electronic device 101 may detect the degree of rotation of a rolling unit provided in the electronic device 101 to determine how much the flexible display is extended.

According to an example embodiment, in operation 1030, the electronic device 101 may determine a main area and a sub area. According to an example embodiment, the main area 710 may indicate, e.g., an area where the screen except for at least one graphical element among the graphical elements displayed on the highest layer of the execution screen of a specific application is displayed. Or, according to an example embodiment, the main area 710 may indicate an area where a screen except for at least one graphical element among the graphical elements identifiable by the user since certain overlaid elements are not displayed on a higher layer although not displayed on the highest layer is displayed. Or, according to an example embodiment, the main area may simply indicate an area where the screen displayed on the lowest layer is displayed when the execution screen of a specific application is constituted of two layers. In some embodiments of the disclosure, for convenience of description, the first object 410 is displayed on the lowest layer, and the second object 420, the third object 430, and the fourth object 440 are displayed to overlay the first object 410 on the same layer. According to an example embodiment, the sub area 720 may indicate, e.g., an area where at least one graphical element (e.g., the second object 420, the third object 430, and/or the fourth object 440) is displayed on the highest layer of the execution screen of a specific application. According to an example embodiment, the sub area may be a plurality of areas or a single area.

According to an example embodiment, in operation 1040, the electronic device 101 may display at least one object (e.g., the first object 410) in the main area 710 and the remaining objects (e.g., the second object 420, the third object 430, and the fourth object 440) in the sub area 720. According to an example embodiment, the remaining objects (e.g., the second object 420, the third object 430, and the fourth object 440) displayed on the highest layer may be displayed in the sub area 720.

According to an example embodiment, in operation 1050, the electronic device 101 may detect a rotation of the electronic device 101. According to an example embodiment, the electronic device 101 may determine whether the electronic device 101 is rotated by a threshold angle (e.g., 60 degrees) or more using a sensor module comprising a sensor (e.g., gyro sensor) provided in the electronic device 101.

According to an example embodiment, in operation 1060, the electronic device 101 may re-determine a main area 710 and a sub area 720. For example, according to an example embodiment, the electronic device 101 may re-determine a main area 710 and a sub area 720 based on an attribute of the application. For example, when the specific application is an application optimized in the portrait orientation, the electronic device 101 according to an example embodiment may re-determine the main area 710 so that the main area 710 is in the portrait orientation in a rotated state of the electronic device 101. Similarly, when the specific application is an application optimized in the landscape orientation, the electronic device 101 according to an example embodiment may re-determine the main area 710 so that the main area 710 is in the landscape orientation in a rotated state of the electronic device 101.

According to an example embodiment, in operation 1070, the electronic device 101 may re-arrange the plurality of objects on the re-determined main area 710 and sub area 720. For example, the remaining objects (e.g., the second object 420, the third object 430, and the fourth object 440) displayed on the highest layer may be displayed in the sub area 720.

FIGS. 11A, 11B, 11C, 11D, and 11E are views illustrating an example of a function or operation as shown in FIG. 10.

Figure 11A:
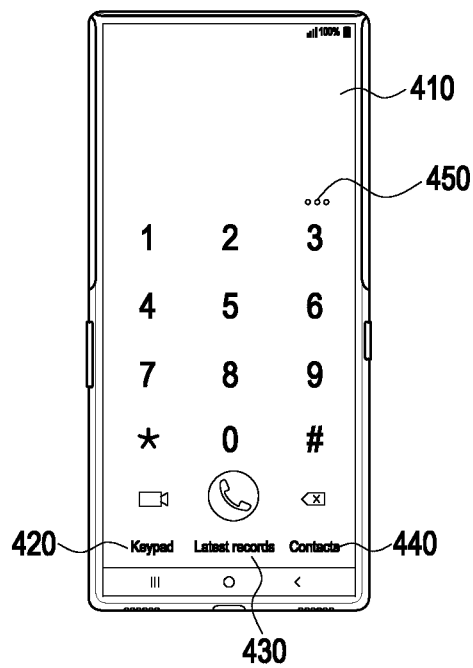
FIGS. 11A, 11B, 11C, 11D, and 11E are views illustrating an example of a function or operation as shown in FIG. 10.
Figure 11B:
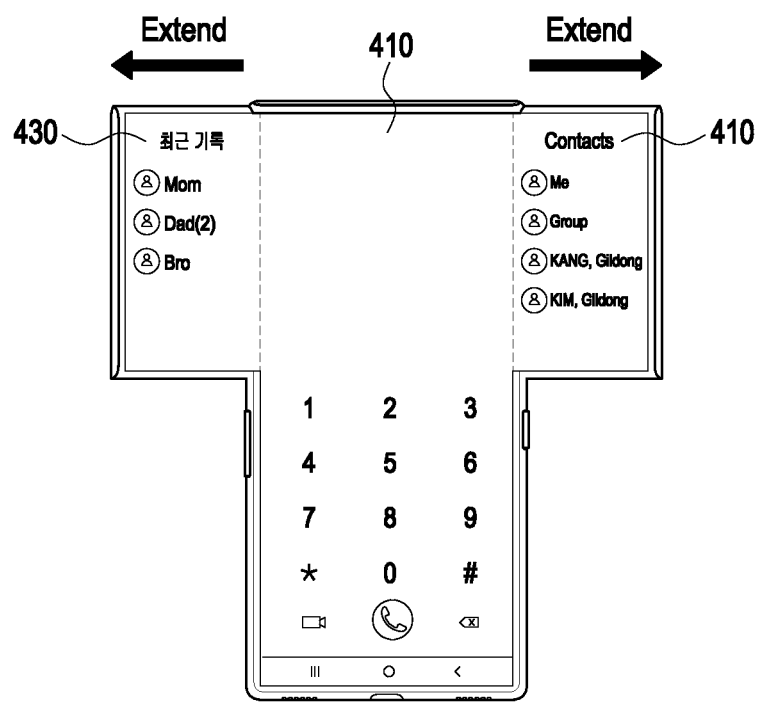
Figure 11C:
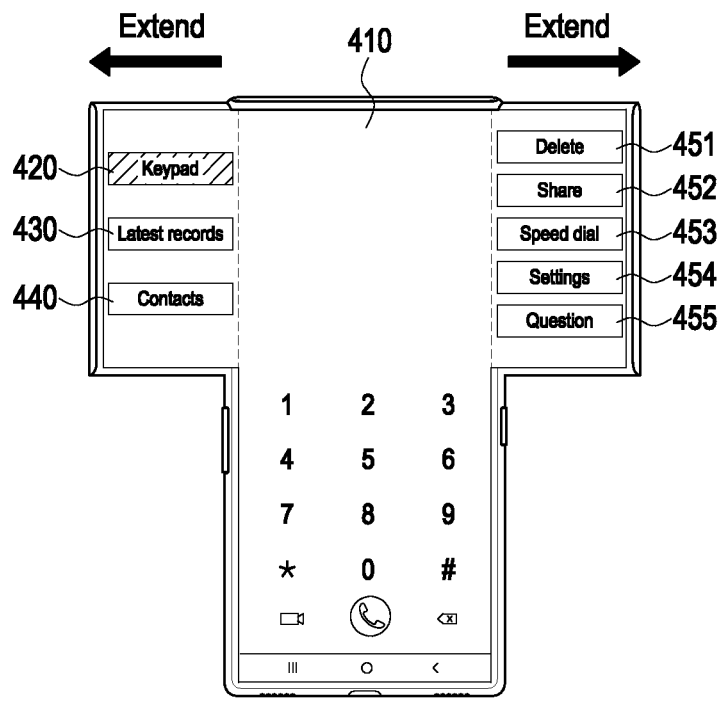
Figure 11D:
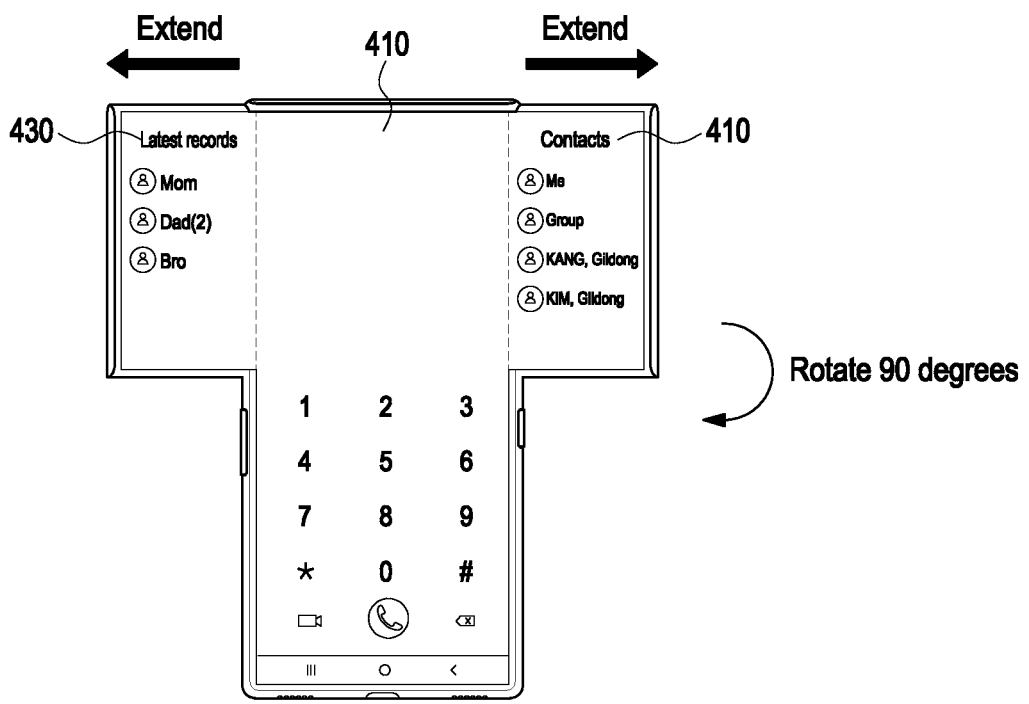
Figure 11E:
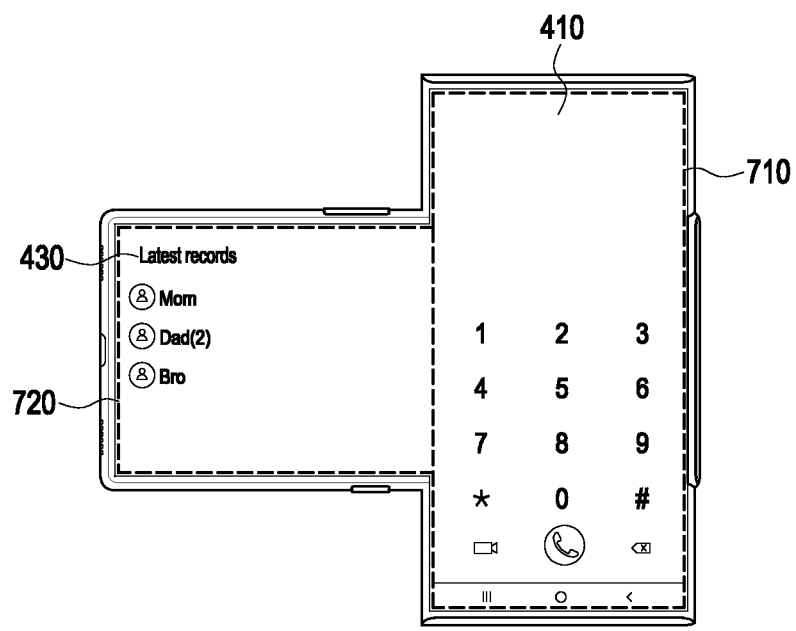

Referring to FIG. 11A, according to an example embodiment, the electronic device 101 may display the execution screen of a specific application (e.g., phone application) on the flexible display. According to an example embodiment, a first object 410 (e.g., screen displayed on the lowest layer), a second object 420, a third object 430, a fourth object 440, and a fifth object 450 on the execution screen of the specific application (e.g., phone application). According to an example embodiment, the second object 420, the third object 430, the fourth object 440, and the fifth object 450 may be displayed on a higher layer than the first object 410. According to an example embodiment, a virtual keypad included in the execution screen of the specific application (e.g., phone application) may be displayed on the same layer or a lower layer than that of the second object 420, the third object 430, the fourth object 440, and the fifth object 450. Referring to FIG. 11B, according to an example embodiment, upon detecting an extension event, the electronic device 101 may display content included in the third object 430 and content included in the fourth object 440 in the sub area 720. Or, as shown in FIG. 11C, according to an example embodiment, the electronic device 101 may display sub menus (e.g., the sixth sub menu 451, the seventh sub menu 452, the eighth sub menu 453, the ninth sub menu 454, and the tenth sub menu 455) of the second object 420, the third object 430, the fourth object 440, and the fifth object 450 in the sub area 720. Referring to FIG. 11C, according to an example embodiment, the electronic device 101 may detect a rotation of the electronic device 101. For example, according to an example embodiment, the electronic device 101 may determine whether the electronic device 101 is rotated by a threshold angle (e.g., 60 degrees) or more using a sensor module (e.g., gyro sensor) provided in the electronic device 101. Referring to FIG. 11E, according to an example embodiment, the electronic device 101 may re-determine a main area 710 and a sub area 720 based on the attribute of the application and re-arrange the plurality of objects on the re-determined main area 710 and sub area 720. For example, as shown in FIG. 11E, when the specific application (e.g., phone application) is an application optimized in the portrait orientation, the electronic device 101 according to an example embodiment may re-determine the main area 710 so that the main area 710 is in the portrait orientation in a rotated state of the electronic device 101. According to an example embodiment, as shown in FIG. 11E, the electronic device 101 may display content related to the third object 430 in the sub area 720. However, this is merely an example, and content related to other objects may be displayed in the sub area. Further, although FIG. 11E illustrates that the second object 420, the third object 430, the fourth object 440, and the fifth object 450 are not displayed, this is exemplary, and at least one object among the second object 420, the third object 430, the fourth object 440, and the fifth object 450 may be displayed in the main area 710.

Figure 12:
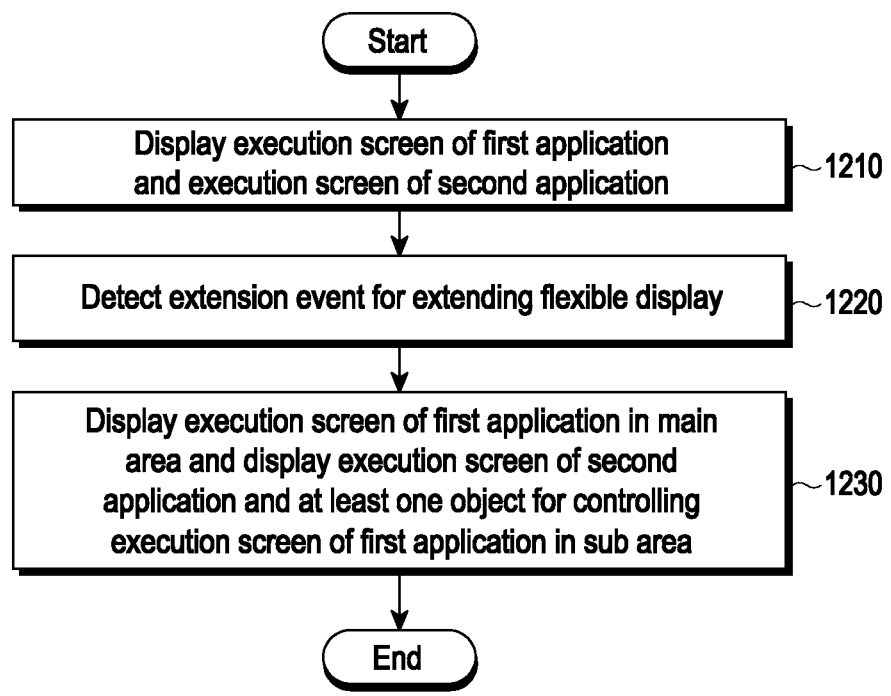
FIG. 12 is a view illustrating an example of a function or operation of displaying execution screens of a plurality of applications on a flexible display extended according to an extension event when the extension event is detected while an electronic device displays the execution screens of the plurality of applications in a multi-window manner according to an example embodiment.

FIG. 12 is a view illustrating an example of a function or operation of displaying execution screens of a plurality of applications on a flexible display extended according to an extension event when the extension event is detected while an electronic device displays the execution screens of the plurality of applications in a multi-window manner according to an example embodiment Referring to FIG. 12, according to an example embodiment, in operation 1210, the electronic device 101 may display the execution screen of a first application and the execution screen of a second application. According to an example embodiment, the execution screen of the first application and the execution screen of the second application may be displayed on the flexible display in a multi-window manner.

According to an example embodiment, in operation 1220, the electronic device 101 may detect an extension event for extending the flexible display.

According to an example embodiment, in operation 1230, the electronic device 101 may display the execution screen of the first application (e.g., video playback application) in the main area and display at least one object for controlling the execution screen of the second application (e.g., message application) and the execution screen of the first application in the sub area. For example, according to an example embodiment, when the flexible display of the electronic device 101 is extended, the electronic device 101 may display the execution screen of the first application, disposed above the execution screen of the second application, in the main area 710.

FIGS. 13A, 13B, 13C, and 13D are views illustrating an example of a function or operation as shown in FIG. 12.

Figure 13D:
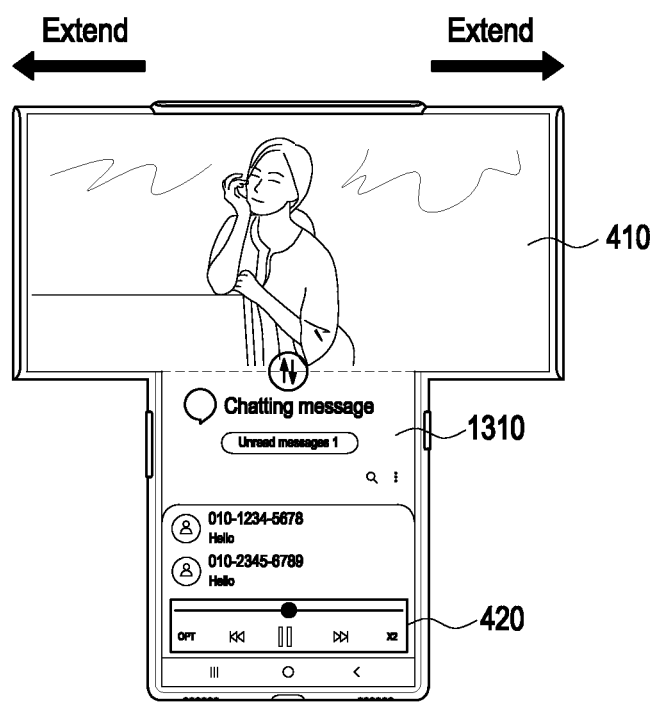

Referring to FIG. 13A, according to an example embodiment, the electronic device 101 may display the execution screen of the first application and the execution screen of the second application on the flexible display in a multi-window manner According to an example embodiment, the execution screen of the first application may include a first object 410 displayed on the lowest layer and a second object 420 displayed on a higher layer than the first object. Further, as shown in FIGS. 13B and 13C, the execution screen of the first application and the execution screen 1310 of the second application may substantially differ in size from each other. Referring to FIG. 13D, when the electronic device 101 is extended, the electronic device 101 according to an example embodiment may display the execution screen of the first application, disposed above the execution screen 1310 of the second application, in the main area. In this case, the second object 420 may be displayed while overlapping the execution screen 1310 of the second application. The second object 420, which is displayed while overlapping the execution screen 1310 of the second application, may be shrunken (or contracted) or not displayed by a user input.

FIGS. 14A, 14B, 15A, 15B, 16A, 16B, 16C, 17A, 17B, and 17C are views illustrating an example in which various example embodiments apply to various applications.

Figure 14A:
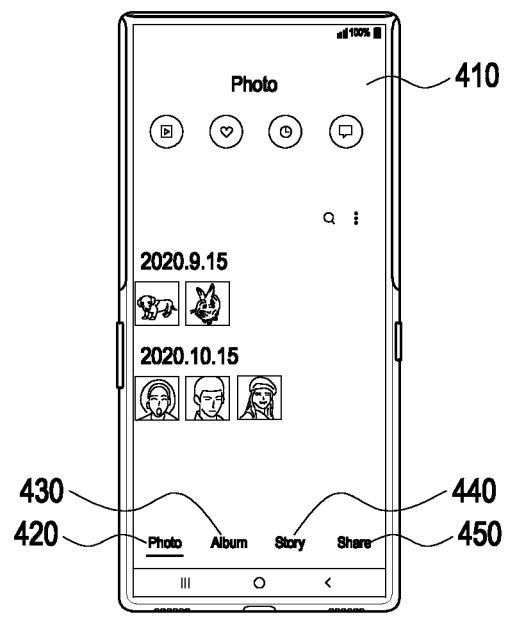
FIGS. 14A, 14B, 15A, 15B, 16A, 16B, 16C, 17A, 17B, and 17C are views illustrating an example in which various example embodiments apply to various applications.
Figure 14B:
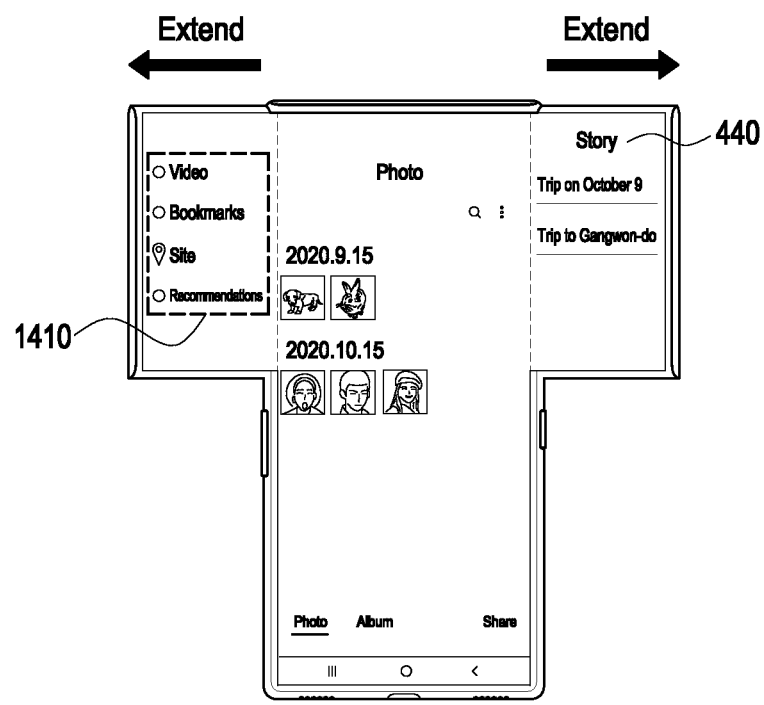

Referring to FIG. 14A, according to an example embodiment, the electronic device 101 may display the execution screen of a specific application (e.g., gallery application). According to an example embodiment, the execution screen of the specific application may include a first object 410 (e.g., screen of the gallery application including a thumbnail image for a captured photo), and a second object 420, a third object 430, a fourth object 440, and a fifth object 450 displayed on the same layer or a higher layer than that of the first object 410. Referring to FIG. 14B, according to an example embodiment, if the electronic device 101 is extended according to an extension event, the electronic device 101 may display content related to the third object 430 and menus 1410 for classifying thumbnail images in the extended area. However, this is merely an example, and content included in the second object 420, the fourth object 440, or the fifth object 450 may be displayed in the extended area. Further, although FIG. 14B illustrates that the third object 430 is displayed in the main area 710, this is exemplary and, when content related to the third object 430 is displayed in the extended area, the third object 430 may not be displayed in the main area 710.

Figure 15A:
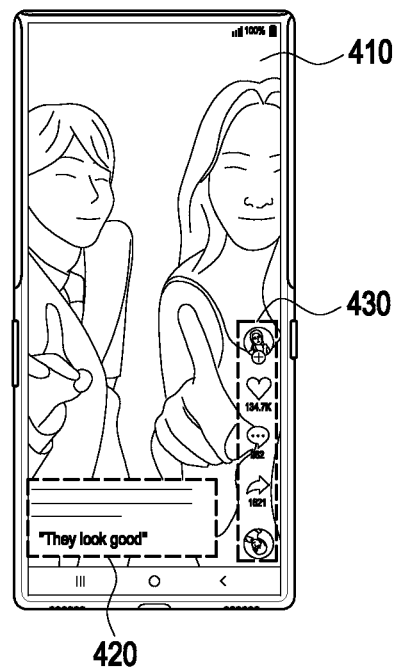
Figure 15B:
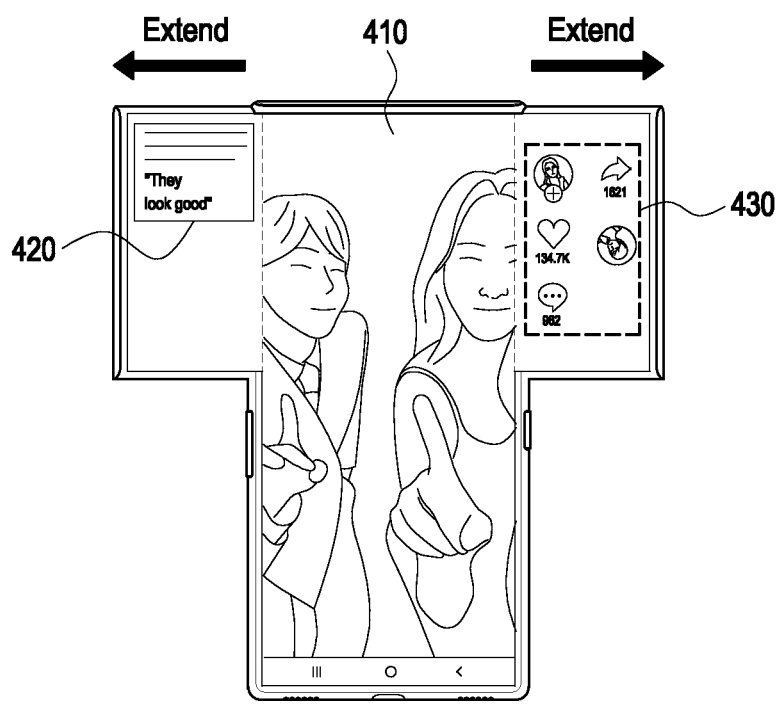

Referring to FIG. 15A, according to an example embodiment, the electronic device 101 may display the execution screen of a specific application (e.g., SNS application). According to an example embodiment, the execution screen of the specific application may include a first object 410 (e.g., screen including a photo captured by camera) and a second object 420 and a third object 430 displayed overlaid on the first object 410. According to an example embodiment, if the flexible display is extended according to an extension event, the electronic device 101 may display the second object 420 and the third object 430 in the extended area as shown in FIG. 15B.

Figure 16A:
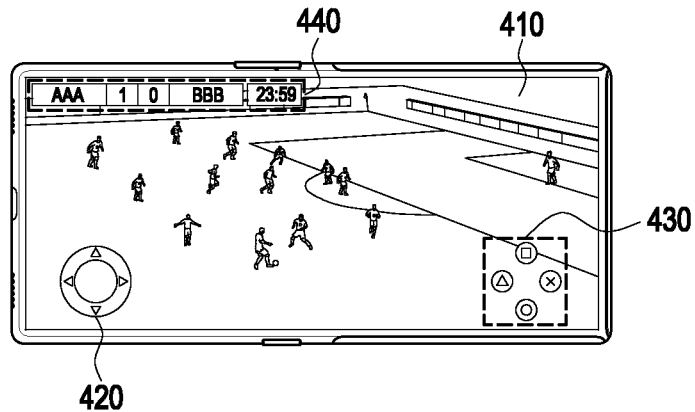
Figure 16B:
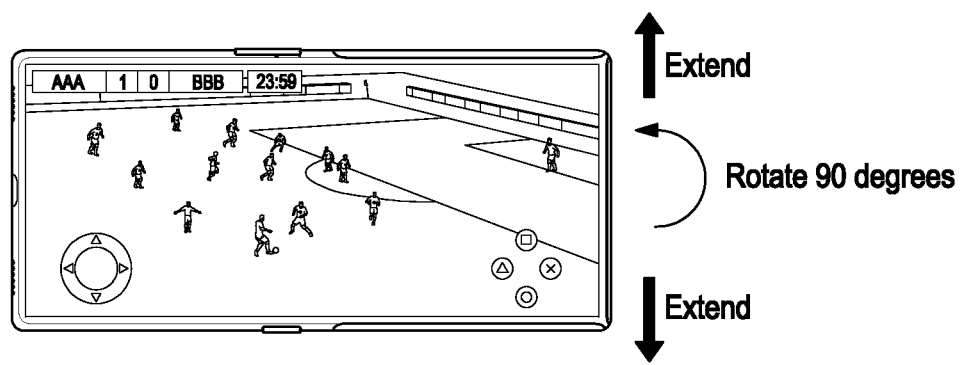
Figure 16C:
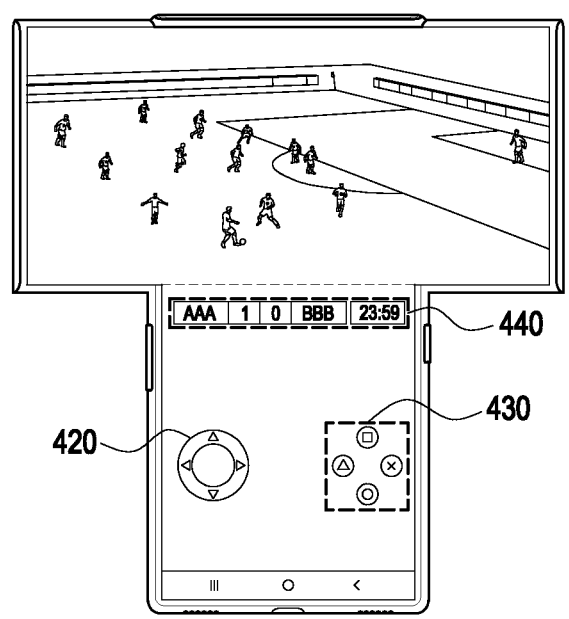

Referring to FIG. 16A, according to an example embodiment, the electronic device 101 may display the execution screen of the specific application (e.g., a game application optimized in the landscape orientation). According to an example embodiment, the execution screen of the specific application may include a first object 410 (e.g., screen displaying the game image), and a second object 420, a third object 430, and a fourth object 440 displayed overlaid on the first object 410. According to an example embodiment, if the flexible display is extended, and the electronic device 101 is rotated according to an extension event and a rotation event as shown in FIG. 16B, the electronic device 101 may display the second object 420, the third object 430, and the fourth object 440 on the sub area 720 as shown in FIG. 16C.

Figure 17A:
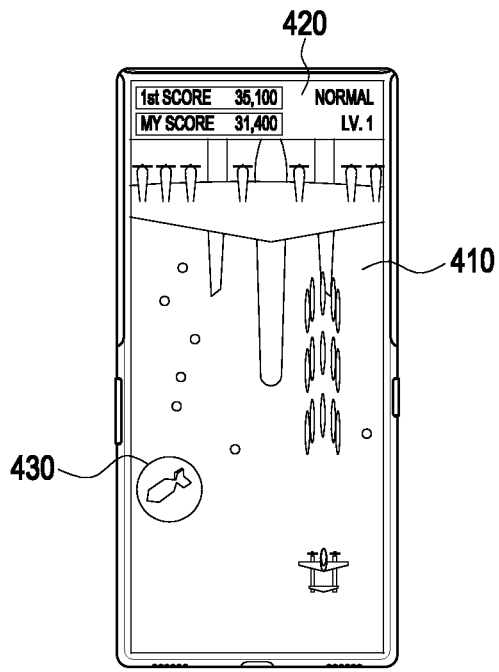
Figure 17B:
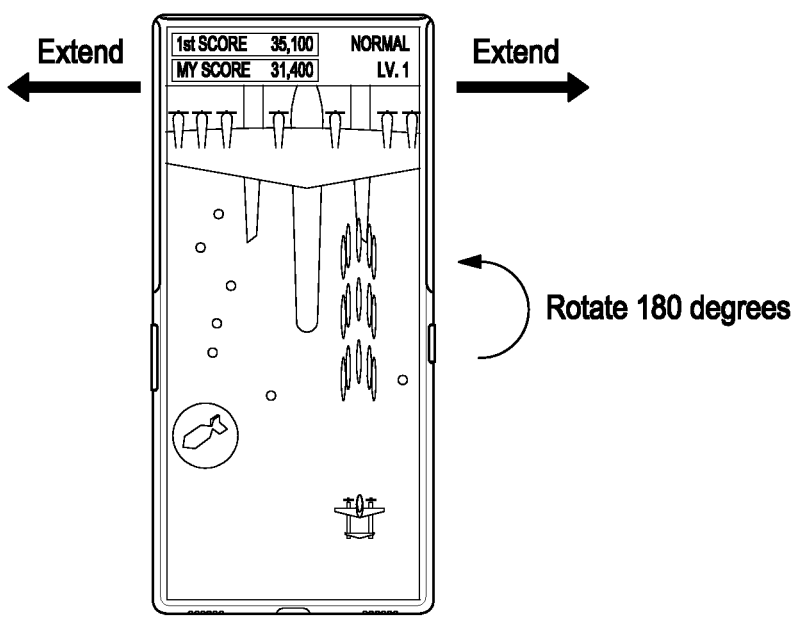
Figure 17C:
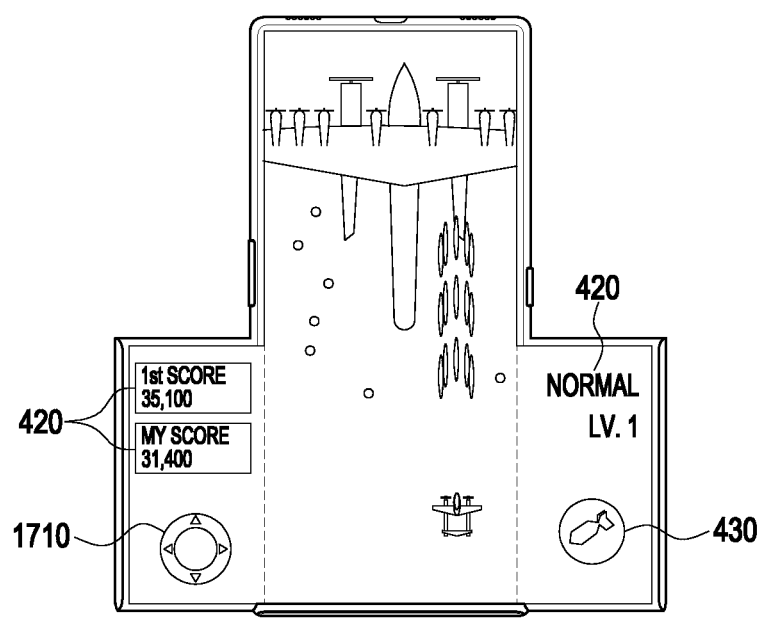

Referring to FIG. 17A, according to an example embodiment, the electronic device 101 may display the execution screen of the specific application (e.g., a game application optimized in the portrait orientation). According to an example embodiment, the execution screen of the specific application may include a first object 410 (e.g., screen displaying the game image), and a second object 420 and a third object 430 displayed overlaid on the first object 410. According to an example embodiment, if the flexible display is extended, and the electronic device 101 is rotated according to an extension event and a rotation event as shown in FIG. 17B, the electronic device 101 may display the second object 420 and the third object 430 on the sub area 720 as shown in FIG. 17C. According to an example embodiment, if the flexible display is extended, the electronic device 101 may display a predesignated controller 1710 for the specific application in the extended area.

FIGS. 18, 19A, 19B, 19C, and 19D are views illustrating an example in which various example embodiments apply to an electronic device according to another embodiment of the disclosure.

Figure 18:
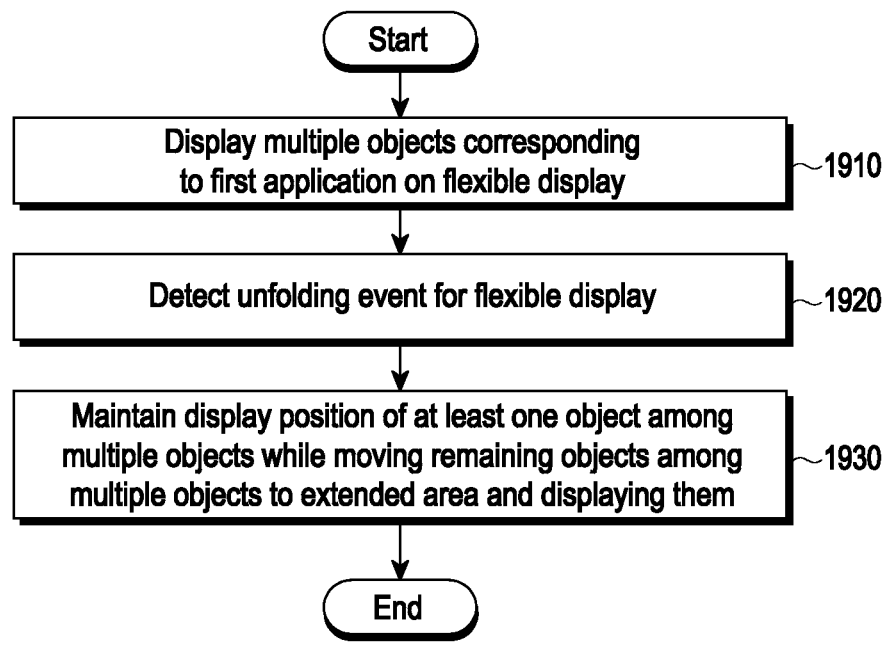
FIGS. 18, 19A, 19B, 19C, and 19D are views illustrating an example in which various example embodiments apply to an electronic device according to another embodiment of the disclosure.

Referring to FIG. 18, according to an example embodiment, in operation 1910, the electronic device 101 may display a plurality of objects corresponding to a first application on the flexible display. According to an example embodiment, the plurality of objects may include, e.g., a view (e.g., screen) displayed on a lowest layer of the execution screen of the first application, a view (e.g., screen) displayed on a middle layer of the execution screen of the first application, a view (e.g., screen) which is a combination of the view displayed on the lowest layer and the view displayed on the middle layer, various graphical elements overlaid and displayed on the view displayed on the lowest layer, middle layer, or combined layer, and/or various graphical elements displayed on the highest layer. According to an example embodiment, operation 1910 may be understood by one of ordinary skill in the art simply as a function or operation of displaying the execution screen of the first application. According to an example embodiment, the flexible display may be substantially in a non-extended state (e.g., substantially closed state) while performing operation 1910. In other words, a state in which the flexible display is extended partially to have a space insufficient to display a specific object may be understood by one of ordinary skill in the art as the non-extended state.

According to an example embodiment, in operation 1920, the electronic device 101 may detect an unfolding event for the flexible display. According to an example embodiment, in operation 1930, the electronic device 101 may maintain the position of display of at least one object among the plurality of objects while moving other remaining objects among the plurality of objects to the extended area and displaying them.

Figure 19A:
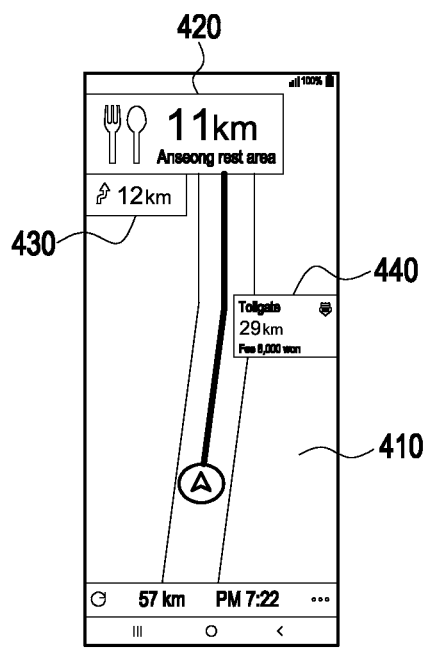
Figure 19B:
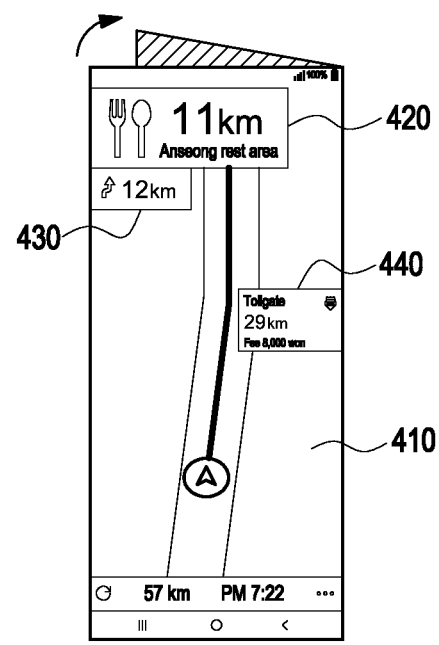
Figure 19C:
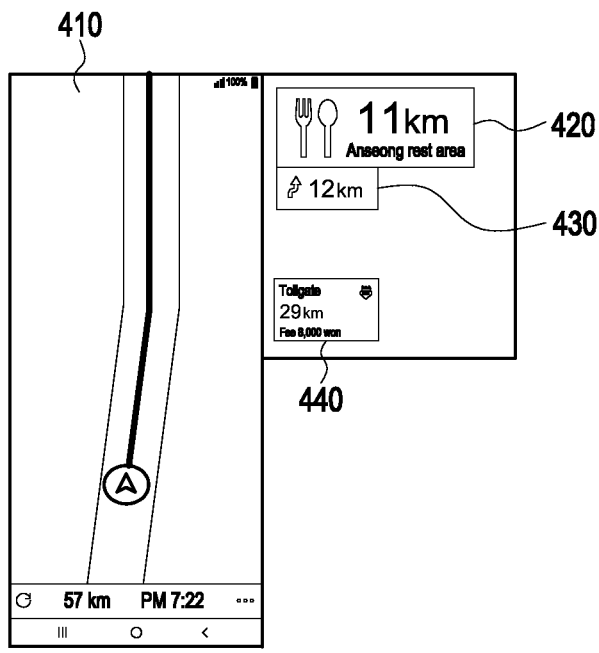
Figure 19D:
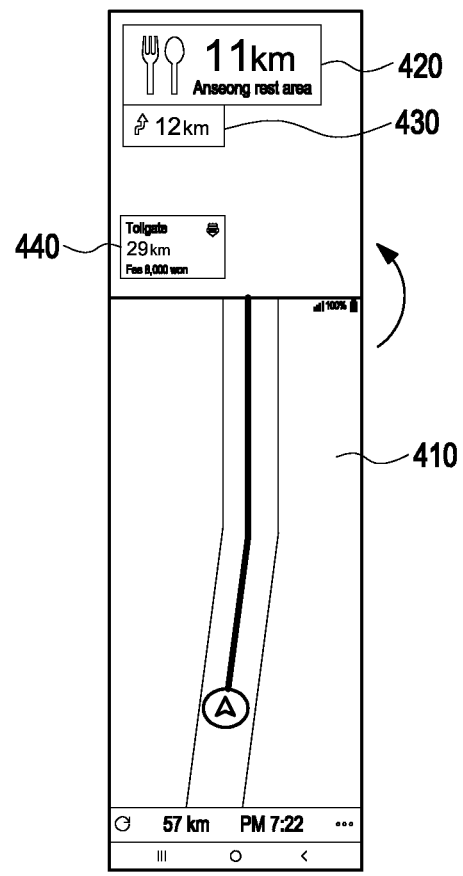

Referring to FIG. 19A, according to an example embodiment, the electronic device 101 may display the first object 410, and the second object 420, the third object 430, and the fourth object 440 displayed overlaid on the first object 410, on the flexible display. Referring to FIG. 19B, according to an example embodiment, the electronic device 101 may detect an unfolding event for the flexible display. Referring to FIG. 19C, according to an example embodiment, the electronic device 101 may display the second object 420, the third object 430, and the fourth object 440 on the flexible display extended according to the unfolding event. Or, according to an example embodiment, the electronic device 101 may have a structure of unfolding (or extending) in the vertical direction as shown in FIG. 19D. Also in this case, the electronic device 101 according to an example embodiment may display the second object 420, the third object 430, and the fourth object 440 on the flexible display extended according to the unfolding event.

Figure 20A:
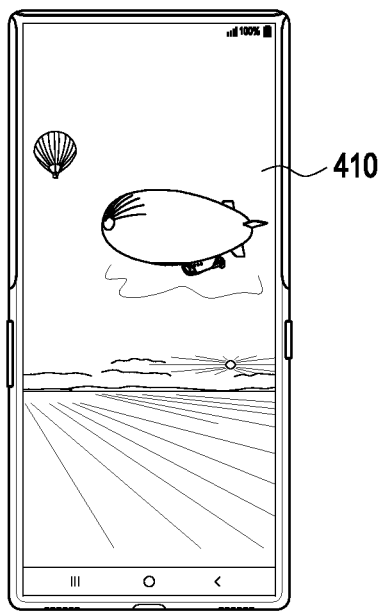
FIGS. 20A and 20B are views illustrating an example of a function or operation of displaying a plurality of objects to control a video being played in an extended area when a video playback application is optimized in a portrait orientation according to an example embodiment.
Figure 20B:
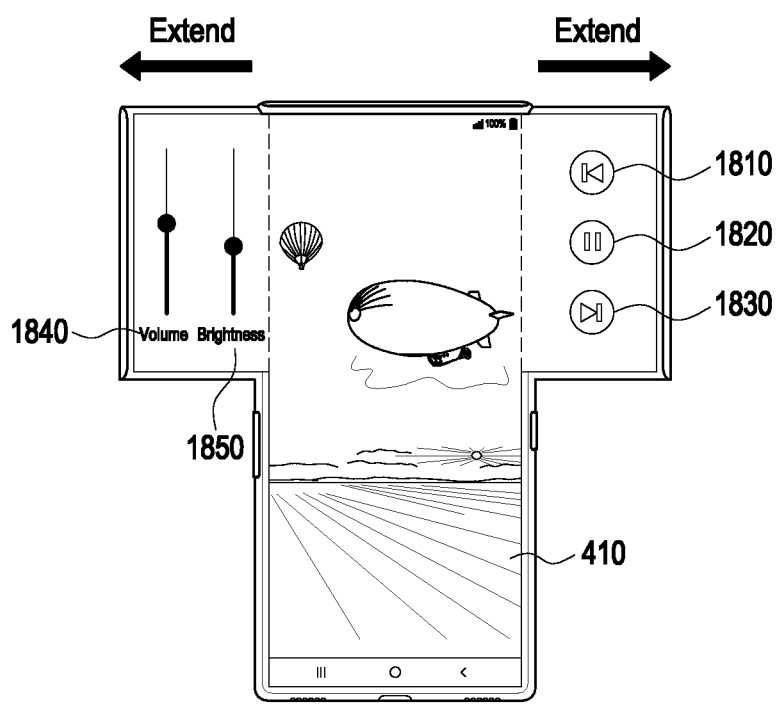
Figure 21:
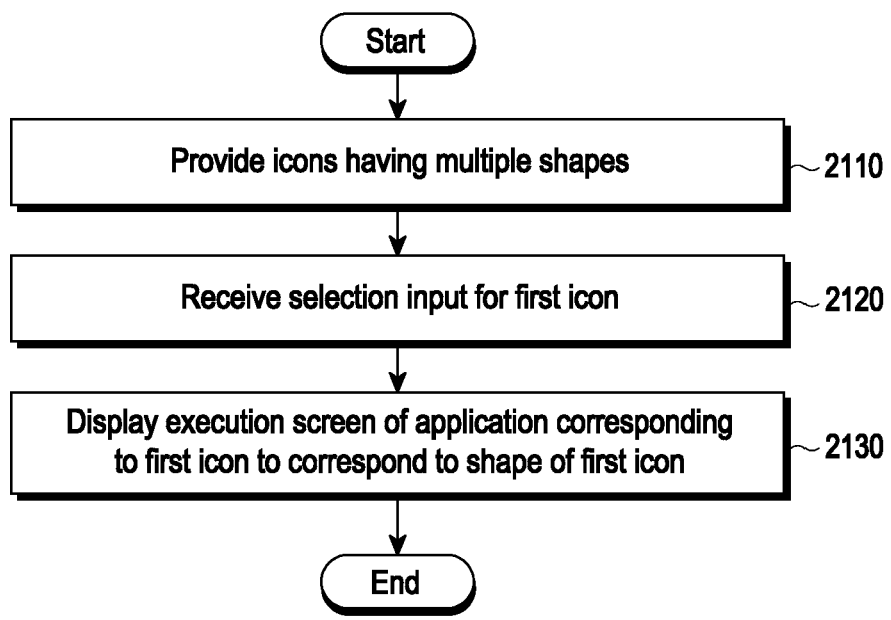
FIGS. 21, 22A, 22B, 22C, 22D, 23A, 23B, and 23C are views illustrating a function or operation of controlling an electronic device 101 through an icon having a plurality of shapes.

FIGS. 20A and 20B are views illustrating an example of a function or operation of displaying a plurality of objects to control a video being played in an extended area when a video playback application is optimized in a portrait orientation according to an example embodiment.

Referring to FIG. 20A, according to an example embodiment, the electronic device 101 may display the execution screen of the video playback application optimized in the portrait orientation on the flexible display. Referring to FIG. 20B, according to an example embodiment, if the electronic device 101 is extended, the electronic device 101 may display various objects (e.g., the sixth object 1810, the seventh object 1820, the eighth object 1830, the ninth object 1840, and the tenth object 1850) for controlling the currently playing video, in the extended area. According to an example embodiment, the first object 410 may be displayed in the main area 710. Although various objects for controlling images are not shown in FIG. 20A, according to various example embodiments, various objects for controlling images, along with the first object 410, may be displayed on the flexible display before the electronic device 101 is substantially extended.

FIGS. 21, 22A, 22B, 22C, 22D, 23A, 23B, and 23C are views illustrating a function or operation of controlling an electronic device 101 through an icon having a plurality of shapes.

Figure 22A:
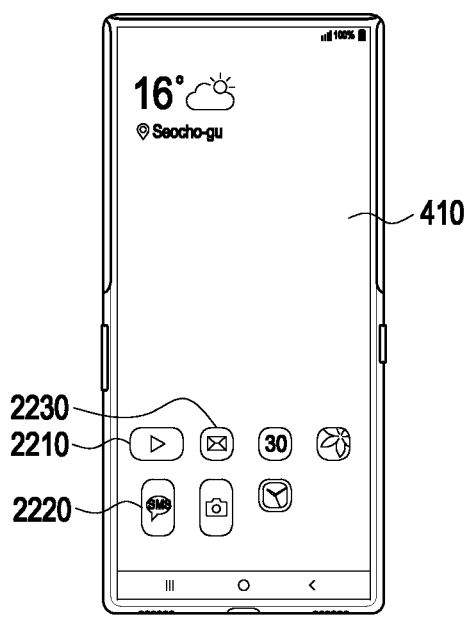

Referring to FIGS. 21, 22A, 22B, 22C, 22D, 23A, 23B, and 23C, according to an example embodiment, the electronic device 101 may provide icons having a plurality of shapes in operation 2110. For example, as shown in FIG. 22A, the plurality of shapes may include a first shape (e.g., a first icon 2210) in which the horizontal length of the icon is substantially longer than the vertical length, a second shape (e.g., a second icon 2220) in which the vertical length is substantially longer than the horizontal length, and a third shape (e.g., a third icon 2230) in which the horizontal length and the vertical length are substantially the same. According to an example embodiment, the icons having the plurality of shapes may be displayed, overlaid on the first object (e.g., the background screen of the home screen).

According to an example embodiment, in operation 2120, the electronic device 101 may receive a selection input 2240 for a specific icon (e.g., the first icon 2210). For example, as shown in FIG. 23A, according to an example embodiment, the electronic device 101 may receive the selection input 2240 for the first icon 2210.

According to an example embodiment, in operation 2130, the electronic device 101 may display the execution screen of an application corresponding to a specific icon to correspond to the shape of the specific icon (e.g., the first icon 2210). For example, upon receiving the selection input 2240 for the first icon 2210 (e.g., video playback application), the electronic device 101 may display the execution screen of the application corresponding to the first icon 2210 in the landscape orientation. In this case, if the electronic device 101 is not in an extended state, the electronic device 101 may extend the flexible display and then display the execution screen of the application corresponding to the first icon 2210 in the landscape orientation.

Figure 22B:
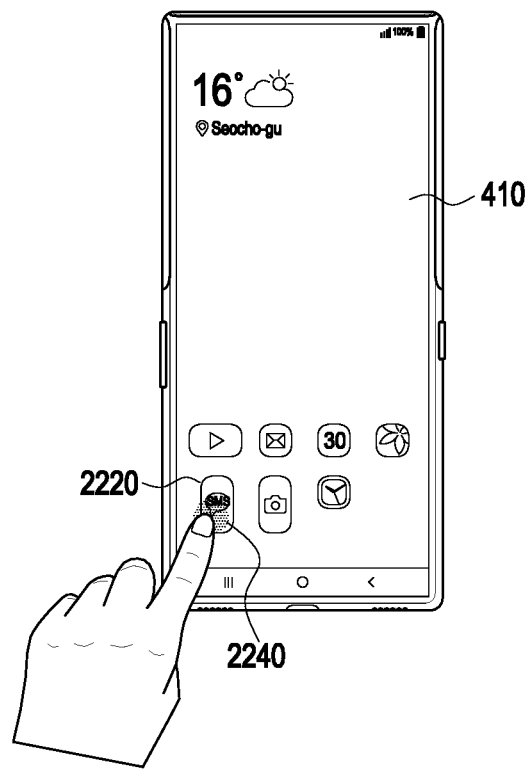
Figure 22C:
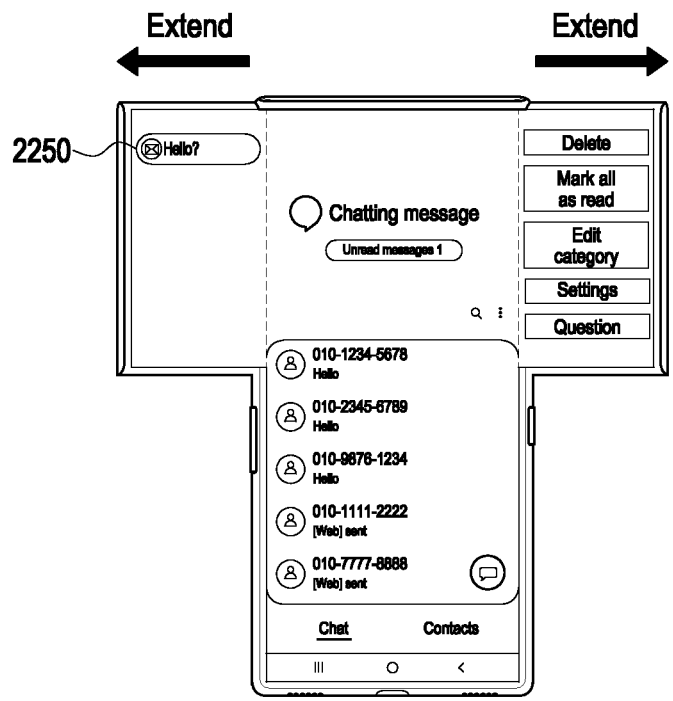
Figure 22D:
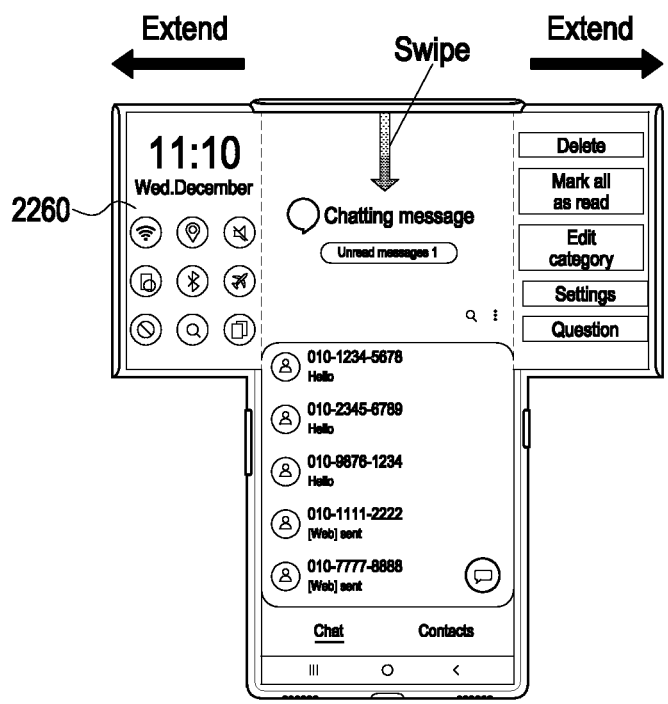

Referring to FIG. 22B, according to an example embodiment, the electronic device 101 may receive a selection input 2240 for the second icon 2220. Referring to FIG. 22C, according to an example embodiment, the electronic device 101 may extend the flexible display and then display the execution screen of the application corresponding to the second icon 2220 in the portrait orientation (in other words, the orientation corresponding to the shape of the icon). According to an example embodiment, when a notification event occurs while displaying the execution screen of the application in the extended state of the electronic device 101, a message 2250 indicating that the notification event occurs may be displayed in the extended area. Referring to FIG. 22D, when a quick panel invoke event occurs while displaying the execution screen of the application in the extended state of the electronic device 101, the quick panel 2260 may be displayed in the extended area.

Figure 23A:
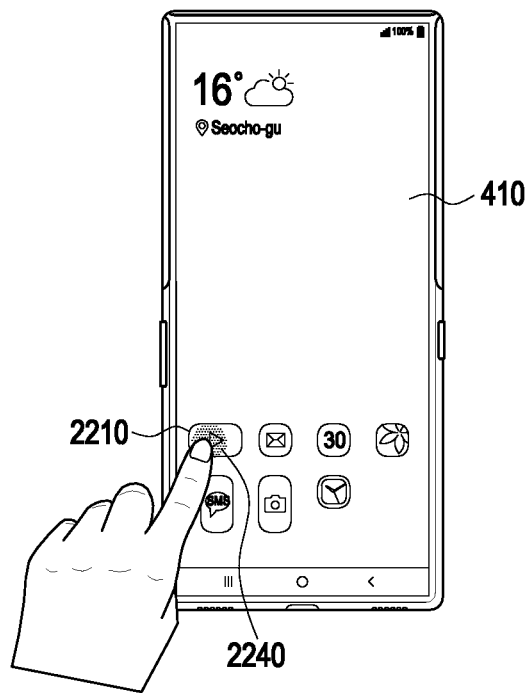
Figure 23B:
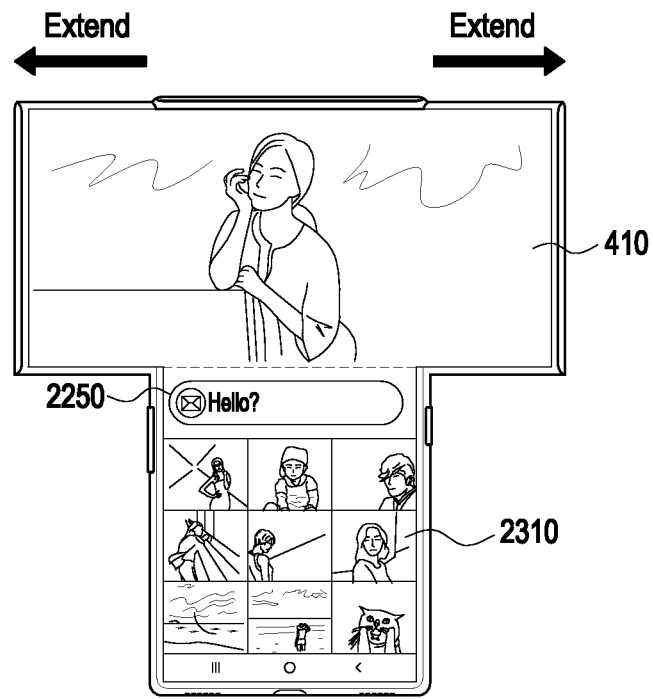
Figure 23C:
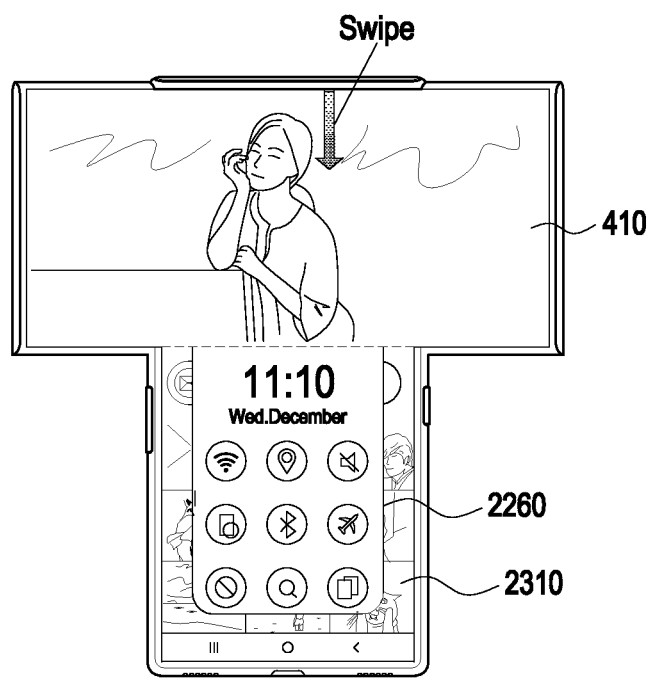

Referring to FIG. 23A, according to an example embodiment, the electronic device 101 may receive a selection input 2240 for the first icon 2210. Referring to FIG. 23B, according to an example embodiment, the electronic device 101 may extend the flexible display and then display the execution screen of the application corresponding to the first icon 2210 in the landscape orientation (in other words, the orientation corresponding to the shape of the icon). According to an example embodiment, when a notification event occurs while displaying the execution screen of the application in the extended state of the electronic device 101, a message 2250 indicating that the notification event occurs may be displayed in the sub area 720 (in other words, the area where the first object 410 is not displayed). According to an example embodiment, a screen 2310 related to a specific function (e.g., video chat function) provided by the specific application (e.g., video playback application) may be displayed in the sub area 720. Referring to FIG. 23C, when a quick panel invoke event occurs while displaying the execution screen of the application in the extended state of the electronic device 101, the quick panel 2260 may be displayed in the sub area 720.

Figure 24A:
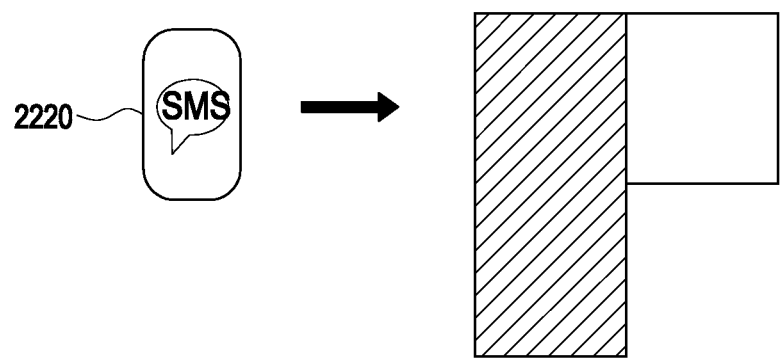
FIGS. 24A and 24B are views illustrating an example in which functions or operations related to FIGS. 21 to 23C are performed by an electronic device 101 according to another example embodiment.
Figure 24B:
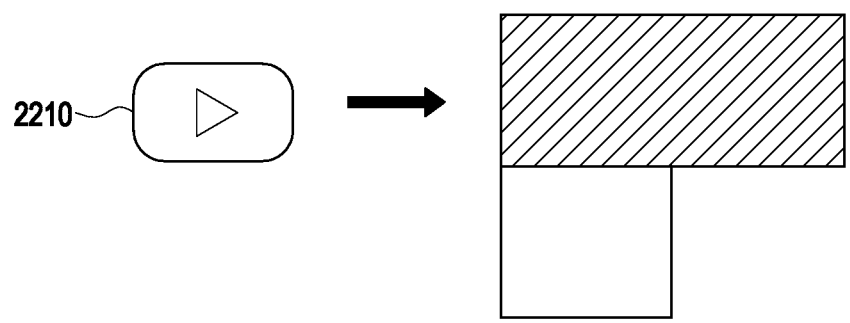

FIGS. 24A and 24B are views illustrating an example in which functions or operations related to FIGS. 21 to 23C are performed by an electronic device 101 according to another embodiment of the disclosure.

Referring to FIG. 24A, according to another embodiment of the disclosure, the electronic device 101 may be an electronic device 101 including a flexible display extended in the shape of "L". According to another embodiment of the disclosure, the electronic device 101 may display the execution screen of a specific application in the portrait orientation (e.g., in the hatched area) when the second icon 2220 is selected. In this case, the notification message 2250 and the quick panel 2260 may be displayed in the extended area (e.g., non-hatched area).

Referring to FIG. 24B, according to another embodiment of the disclosure, when the first icon 2210 is selected, the electronic device 101 may display the execution screen of the specific application in the landscape orientation (e.g., in the hatched area). In this case, the notification message 2250 and the quick panel 2260 may be displayed in the remaining area (e.g., non-hatched area).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic device is not limited to the above-listed embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. In the disclosure, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device, comprising:
a flexible display; and
at least one processor, and
memory, wherein the memory stores instructions that, when executed by the at least one processor, cause the electronic device to:
display, in a first area of the flexible display, an execution screen of a first application and a plurality of objects of the first application, wherein the plurality of objects are overlapping the execution screen of the first application;
detect an extension event for extending the display area of the flexible display while displaying the plurality of objects via the display area of the flexible display; and
maintain a position of display of the execution screen of the first application while moving the plurality of objects overlapping the execution screen of the first application to a second area of the flexible display extended according to the extension event and displaying the moved objects,
identify that the electronic device is rotated while the execution screen of the first application is displayed in the first area of the flexible display and the plurality of objects are displayed in the second area of the flexible display,
based on the identification, display the execution screen of the first application in a re-determined first area including a part of the first area and the second area, and at least one object among the plurality of objects in a re-determined second area including remaining part of the first area.

2. The electronic device of claim 1, wherein the first area includes a portrait orientation and/or a landscape orientation.

3. The electronic device of claim 2, wherein, when the first area is determined to be in the portrait orientation according to a display attribute of the first application.

4. The electronic device of claim 2, wherein, when the first area is determined to be in the landscape orientation according to a display attribute of the first application.

5. The electronic device of claim 1, wherein the instructions, when executed by the at least one processor, cause the electronic device to:
control to display a plurality of objects of the first application and a second application different from the first application on the flexible display in a multi-window manner; and
control to display the at least one object of the first application in the first area including, at least, the extended area and display the plurality of objects of the second application and the one or more objects of the first application in the second area.

6. The electronic device of claim 5, wherein the one or more objects of the first application are displayed while overlapping the plurality of objects of the second application in the second area in a state in which the at least one object of the first application is displayed in the first area.

7. A method for controlling an electronic device, comprising:
displaying, in a first area of a flexible display of the electronic device, an execution screen of a first application and a plurality of objects of the first application, wherein the plurality of objects are overlapping the execution screen of the first application;
detecting an extension event for extending the display area of the flexible display while displaying the plurality of objects via the display area of the flexible display; and
maintaining a position of display of execution screen of the first application while moving remaining objects of the plurality of objects overlapping the execution screen of the first application to a second area of the flexible display extended according to the extension event and displaying the moved objects,
identify that the electronic device is rotated while the execution screen of the first application is displayed in the first area of the flexible display and the plurality of objects are displayed in the second area of the flexible display,
based on the identification, display the execution screen of the first application in a re-determined first area including a part of the first area and the second area, and at least one object among the plurality of objects in a re-determined second area including remaining part of the first area.

8. The method of claim 7, wherein the first area includes a portrait orientation and/or a landscape orientation.

9. The method of claim 8, wherein when the first area is determined to be in the portrait orientation according to a display attribute of the first application.

10. The method of claim 8, wherein when the first area is determined to be in the landscape orientation according to a display attribute of the first application.

\* \* \* \* \*